(12) United States Patent
Heeger et al.

(10) Patent No.: US 11,593,068 B2
(45) Date of Patent: Feb. 28, 2023

(54) SYSTEM, METHOD, AND APPARATUS FOR RECURRENT NEURAL NETWORKS

(71) Applicant: NEW YORK UNIVERSITY, New York, NY (US)

(72) Inventors: David J. Heeger, New York, NY (US); Wayne E. Mackey, Clifton, NJ (US)

(73) Assignee: New York University, New York, NY (US)

( * ) Notice: Subject to any disclaimer, the term of this patent is extended or adjusted under 35 U.S.C. 154(b) by 1039 days.

(21) Appl. No.: 16/286,302

(22) Filed: Feb. 26, 2019

(65) Prior Publication Data
US 2019/0265950 A1 Aug. 29, 2019

Related U.S. Application Data

(60) Provisional application No. 62/636,042, filed on Feb. 27, 2018.

(51) Int. Cl.
*G06F 7/544* (2006.01)
*G06N 3/08* (2006.01)
*G06N 20/00* (2019.01)
*G06N 3/063* (2006.01)

(52) U.S. Cl.
CPC ......... *G06F 7/5443* (2013.01); *G06N 3/0635* (2013.01); *G06N 3/08* (2013.01); *G06N 20/00* (2019.01)

(58) Field of Classification Search
CPC ...... G06F 7/5443; G06N 3/0635; G06N 3/08; G06N 20/00; G06N 3/063; G06N 5/003; G06N 7/005; G06N 20/10; G06N 3/084; G06N 3/0445
See application file for complete search history.

(56) References Cited

U.S. PATENT DOCUMENTS

| | | | |
|---|---|---|---|
| 10,521,715 B1* | 12/2019 | Ioffe | G06N 3/08 |
| 11,164,066 B1* | 11/2021 | Dai | G06N 3/084 |
| 2017/0220925 A1* | 8/2017 | Alsharif | G06N 3/08 |

(Continued)

OTHER PUBLICATIONS

Ying Xiao, "Blind Equalization in Underwater Acoustic Communication by Recurrent Neural Network with Bias", Proceedings of the 7th World Congress on Intelligent Control and Automation Jun. 25-27, 2008, Chongqing, China (Year: 2008).*

(Continued)

*Primary Examiner* — Ajay Ojha
(74) *Attorney, Agent, or Firm* — Foley & Lardner LLP

(57) ABSTRACT

A method for computation with recurrent neural networks includes receiving an input drive and a recurrent drive, producing at least one modulatory response; computing at least one output response, each output response including a sum of: (1) the input drive multiplied by a function of at least one of the at least one modulatory response, each input drive including a function of at least one input, and (2) the recurrent drive multiplied by a function of at least one of the at least one modulatory response, each recurrent drive including a function of the at least one output response, each modulatory response including a function of at least one of (i) the at least one input, (ii) the at least one output response, or (iii) at least one first offset, and computing a readout of the at least one output response.

19 Claims, 12 Drawing Sheets

(56) References Cited

U.S. PATENT DOCUMENTS

2018/0053085 A1* 2/2018 Matsumoto .......... G06N 3/0445

OTHER PUBLICATIONS

Cho, K., et al., "Learning Phrase Representations using RNN Encoder-Decoder for Statistical Machine Translation", Cornell University Computer Science Computation and Language, arXiv:1406.1078v3, 2014, 15 pages.
Hochreiter, S., et al., "Long Short-Term Memory", Neural Computation, 1997, 9(8):1735-1780.
Karpathy, A., "The Unreasonable Effectiveness of Recurrent Neural Networks", <http://karpathy.github.io/2015/05/21/rnn-effectiveness/>, May 21, 2015, 27 pages.
Olah, C., "Understanding LSTM Networks", <http://colah.github.io/posts/2015-08-Understanding-LSTMs/>, Aug. 27, 2015, 8 pages.

* cited by examiner

US 11,593,068 B2

SYSTEM, METHOD, AND APPARATUS FOR RECURRENT NEURAL NETWORKS

CROSS-REFERENCE TO RELATED APPLICATIONS

The present disclosure claims the benefit of and priority to U.S. Provisional Application No. 62/636,042, titled "SYSTEM, METHOD, AND APPARATUS FOR RECURRENT NEURAL NETWORKS," filed Feb. 27, 2018, the disclosure of which is incorporated herein by reference in its entirety.

TECHNICAL FIELD

The present disclosure relates generally to systems, methods, and apparatuses for signal processing and artificial intelligence (AI). More particularly, the present disclosure relates to systems, methods, and apparatuses for recurrent neural networks.

BACKGROUND

Long Short-Term Memory networks (LSTMs) are a class of recurrent neural networks (RNNs) that have been used in a wide variety of applications including text processing, computer vision and image processing, music processing, and speech processing. Unlike conventional RNNs, LSTMs are capable of representing and manipulating long-term dependencies. LSTMs were introduced by Hochreiter & Schmidhuber (Hochreiter and Schmidhuber 1997). Since then, several variants of the basic architecture have been developed and tested for a variety of applications. One of the variants, called a gated recurrent unit (GRU), is currently popular (Cho, Van Merriënboer et al. 2014). For an introduction to RNNs and LSTMs, including demonstrations of what can be done with RNNs and LSTMs, see these two blogs: "Understanding LSTM Networks," available at Colah's blog, and "The Unreasonable Effectiveness of Recurrent Neural Networks," available at the Andrej Karpathy blog.

For many applications (e.g., speech, music, human movement), the dynamics of the input signals may oscillate over time. LSTMs are not well-suited for these kinds of signals because they approximate oscillatory signals with piecewise constant functions.

LSTMs have been proven to be useful in a variety of applications, but they are difficult to design because it is difficult to understand their functionality.

AI systems are anticipated to become widespread, impacting in all sectors of society, but these systems cost energy. A person of skill in the art recognizes that analog circuitry (including, but not limited to, analog very large scale integration (VLSI)) may be more energy-efficient in comparison to representing and processing information digitally. LSTMs, because they are digital recurrent neural nets, do not benefit from the energy-efficiency of analog circuitry.

SUMMARY

In one implementation, the present disclosure describes a method for computation with recurrent neural networks. The method includes receiving, by one or more computational engines, an input drive and a recurrent drive; producing, by each of one or more modulators, at least one modulatory response; computing, by the one or more computational engines, at least one output response using one or more computational units, each output response including a sum of: (1) the input drive multiplied by a function of at least one of the at least one modulatory response, each input drive including a function of at least one input, and (2) the recurrent drive multiplied by a function of at least one of the at least one modulatory response, each recurrent drive including a function of the at least one output response, each modulatory response including a function of at least one of (i) the at least one input, (ii) the at least one output response, or (iii) at least one first offset; and computing a readout of the at least one output response, the readout including a function of the at least one output response.

In some embodiments, the method includes computing, by each computational engines, a sum of the input drive and the recurrent drive, wherein the at least one input includes a plurality of inputs the at least one output response includes a plurality of output responses, the input drive depends on a first weighted sum of the plurality of inputs multiplied by a function of at least one of the at least one modulatory response, the first weighted sum including at least one second offset, the recurrent drive depends on a second weighted sum of the plurality of output responses multiplied by a function of at least one of the at least one modulatory response, the second weighted sum including at least one third offset, and each weight corresponding to each weighted sum, the at least one first offset, the at least one second offset, and the at least one third offset are each one of a real number and a complex number. In some embodiments, the method includes executing a machine learning algorithm to determine the weights and offsets in each weighted sum, wherein the machine learning algorithm comprises at least one of a neural network, support vector machine, regression, Bayesian network, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization algorithm. In some embodiments, the method includes applying an output nonlinearity to the at least one output response. In some embodiments, the output nonlinearity is one of rectification, halfwave rectification, a sigmoid, hyperbolic tangent, or normalization. In some embodiments, the readout is a third weighted sum of the values resulting from subjecting the at least one output response to the output nonlinearity, the third weighted sum is based on at least one third weight and includes at least one fourth offset, and the at least one third weight and the at least one fourth offset are each one of a real number and a complex number.

In some embodiments, the method includes computing, by at least one computational engine, a sum of a plurality of recurrent drives, each recurrent drive including a product of a modulatory response and a weighted sum of the outputs, each modulatory response including a weighted sum of the inputs and a weighted sum of the outputs. In some embodiments, the method includes computing, by each modulator, a third weighted sum of: (1) a fourth weighted sum of the at least one input, wherein the at least one input includes a plurality of inputs, wherein the fourth weighted sum includes at least one fourth offset; and (2) a fifth weighted sum of the at least one output response, wherein the at least one output response includes a plurality of output responses, wherein the fifth weighted sum includes at least one fifth offset, and wherein each weight corresponding to each of the fourth and fifth weighted sums, the at least one fourth offset, and the at least one fifth offset are each one of a real number and a complex number. In some embodiments, the method includes applying an output nonlinearity to the third weighted sum. In some embodiments, the method includes executing a machine learning algorithm to determine each weight and offset, wherein the machine learning algorithm comprises at least one of a neural network, a support vector machine, regression, Bayesian network, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization algorithm.

In some embodiments, the readout is a weighted sum of the at least one output response, the at least one output response comprising a plurality of output responses, wherein the weighted sum includes at least one second offset, and wherein each weight corresponding to the weighted sum and the at least one second offset are each one of a real number and a complex number.

In some embodiments, the at least one input to a first one or more of the computational engines includes at least one readout from at least one other computational engine of the one or more computational engines.

In some embodiments, the method includes using the at least one output response to control operation of a robotic device using open loop control based on a linear transform of the readout or closed loop control.

In some embodiments, the method includes varying the one or more modulators to adjust for the at least one of compression or dilation of the at least one input, where the at least one input is at least one of compressed or dilated as a function of time.

In some embodiments, the method includes normalizing the at least one output response.

In some embodiments, at least one of the one or more modulators is computed as a nonlinear function of the at least one input and the at least one output.

In some embodiments, the one or more computational engines are a first one or more computational engines, and the method includes providing the at least one readout to a second one or more computational engines.

In some embodiments, the method includes performing recursive quadrature filtering.

In some embodiments, the method includes using a plurality of recurrent weight matrices, each recurrent weight matrix multiplied by at least one of the one or more modulators.

In another implementation, the present disclosure describes a system for computation with recurrent neural networks. The system includes one or more processors, and a memory storing computer-readable instructions which when executed by the one or more processors, cause the one or more processors to compute at least one modulatory response using one or more modulators; compute at least one output response using one or more computational engines, each computational engines configured to receive an input drive and a recurrent drive, each output response including a sum of: (1) the input drive multiplied by a function of at least one of the at least one modulatory response, each input drive including a function of at least one input, and (2) the recurrent drive multiplied by a function of at least one of the at least one modulatory response, each recurrent drive including a function of the at least one output response, each modulatory response including a function of at least one of (i) the at least one input, (ii) the at least one output response, or (iii) at least one first offset; and compute a readout of the at least one output response, the readout including a function of the at least one output response.

In some embodiments, the system includes instructions to compute, by each computational engine, a sum of the input drive and the recurrent drive, wherein, the at least one input includes a plurality of inputs, the at least one output response includes a plurality of output responses, the input drive depends on a first weighted sum of the plurality of inputs multiplied by a function of at least one of the at least one modulatory response, the first weighted sum including at least one second offset, the recurrent drive depends on a second weighted sum of the plurality of output responses multiplied by a function of at least one of the at least one modulatory response, the second weighted sum including at least one third offset, and each weight corresponding to each weighted sum, the at least one first offset, the least one second offset, and the at least one third offset are each one of a real number and a complex number. In some embodiments, the system includes instructions to execute a machine learning algorithm to determine the weights and offsets in each weighted sum, wherein the machine learning algorithm comprises at least one of a neural network, support vector machine, regression, Bayesian network, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization algorithm. In some embodiments, the system includes instructions to apply an output nonlinearity to the at least one output response. In some embodiments, the output nonlinearity is one of rectification, halfwave rectification, a sigmoid, hyperbolic tangent, or normalization. In some embodiments, the readout is a third weighted sum of the values resulting from subjecting the at least one output response to the output nonlinearity, wherein the third weighted sum is based on at least one third weight and includes at least one fourth offset, and wherein the at least one third weight and the at least one fourth offset are each one of a real number and a complex number.

In some embodiments, the system includes instructions to compute, by at least one computational engine, a sum of a plurality of recurrent drives, each recurrent drive including a product of a modulatory response and a weighted sum of the outputs, each modulatory response including a weighted sum of the inputs and a weighted sum of the outputs. In some embodiments, the system includes instructions to compute, by each modulator, a third weighted sum of: (1) a fourth weighted sum of the at least one input, wherein the at least one input includes a plurality of inputs, wherein the fourth weighted sum includes at least one fourth offset; and (2) a fifth weighted sum of the at least one output response, wherein the at least one output response includes a plurality of output responses, wherein the fifth weighted sum includes at least one fifth offset, and wherein each weight corresponding to each of the fourth and fifth weighted sums, the at least one fourth offset, and the at least one fifth offset are each one of a real number and a complex number. In some embodiments, the system includes instructions to apply an output nonlinearity to the third weighted sum.

In some embodiments, the system includes instructions to execute a machine learning algorithm to determine the weights and offsets in each weighted sum, wherein the machine learning algorithm comprises at least one of a neural network, support vector machine, regression, Bayesian network, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization algorithm.

In some embodiments, the readout is a weighted sum of the at least one output response, the at least one output response comprising a plurality of output responses, wherein the weighted sum includes a second offset, and wherein each weight corresponding to each weighted sum and each offset are one of a real number and a complex number.

In some embodiments, the at least one input to a first one or more of the computational engines comprises at least one readout from at least one other computational engine of the one or more computational engines.

In some embodiments, the system includes instructions to use the at least one output response to control operation of a robotic device using open loop control based on a linear transform of the readout or closed loop control.

In some embodiments, the system includes instructions to vary the one or more modulators to adjust for the at least one of compression or dilation of the at least one input, where the at least one input is at least one of compressed or dilated as a function of time.

In some embodiments, the system includes instructions to normalize the at least one output response.

In some embodiments, at least one of the one or more modulators is computed as a nonlinear function of at least one of the at least one input and the at least one output.

In some embodiments, the one or more computational engines are a first one or more computational engines, and the system includes instructions to provide the at least one readout to a second one or more computational engines.

In some embodiments, the system includes instructions to perform recursive quadrature filtering.

In some embodiments, the system includes instructions to use a plurality of recurrent weight matrices, each recurrent weight matrix multiplied by at least one of the one or more modulators.

In a further implementation, the present disclosure describes a device for computation with recurrent neural networks. The device includes an analog electrical-circuit for implementing a recurrent neural network. The analog electrical-circuit is configured to compute at least one output response from one or more computational units. The analog electrical-circuit is further configured to compute at least one modulatory response from one or more modulators. The analog electrical-circuit is further configured to compute a readout of the at least one output response. Each output response is the sum of an input drive multiplied by a function of at least one of the at least one modulator response plus a recurrent drive multiplied by a function of at least one of the at least one modulator response. Each input drive is a function of one or more inputs. Each recurrent drive is a function of one or more of the at least one output response. Each modulatory response is a function of at least one of (i) the one or more inputs, (ii) the at least one output response, or (iii) at least one first offset. The readout is a function of the at least one output response.

In some embodiments, the device computes, by each computational unit, a sum of the input drive and the recurrent drive, wherein the at least one input includes a plurality of inputs, the at least one output response includes a plurality of output responses, the input drive depends on a first weighted sum of the plurality of inputs multiplied by a function of at least one of the at least one modulatory response, the first weighted sum including at least one second offset, the recurrent drive depends on a second weighted sum of the plurality of output responses multiplied by a function of at least one of the at least one modulatory response, the second weighted sum including at least one third offset, and each weight corresponding to each weighted sum, the at least one first offset, the at least one second offset, and the at least one third offset are each one of a real number and a complex number. In some embodiments, the device receives the weights and offsets from a processing circuit configured to execute a machine learning algorithm to determine the weights and offsets in each weighted sum algorithm, wherein the machine learning algorithm comprises at least one of a neural network, support vector machine, regression, Bayesian network, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization algorithm. In some embodiments, the analog-electrical circuit is further configured to apply an output nonlinearity to the at least one output response. In some embodiments, the output nonlinearity is one of rectification, halfwave rectification, a sigmoid, hyperbolic tangent, or normalization. In some embodiments, the readout is a third weighted sum of the values resulting from subjecting the at least one output response to the output nonlinearity, wherein the third weighted sum is based on at least one third weight and includes at least one fourth offset, and wherein the at least one third weight and the at least one fourth offset are each one of a real number and a complex number.

In some embodiments, the device computes a sum of a plurality of recurrent drives, each recurrent drive including a product of a modulatory response and a weighted sum of the outputs, each modulatory response including a weighted sum of the inputs and a weighted sum of the outputs. In some embodiments, the device computes, by each modulator, a third weighted sum of: (1) a fourth weighted sum of the at least one input, wherein the at least one input includes a plurality of inputs, wherein the fourth weighted sum includes at least one fourth offset; and (2) a fifth weighted sum of the at least one output response, wherein the at least one output response includes a plurality of output responses, wherein the fifth weighted sum includes at least one fifth offset, and wherein each weight corresponding to each of the fourth and fifth weighted sums, the at least one fourth offset, and the at least one fifth offset are each one of a real number and a complex number. In some embodiments, the analog-electrical circuit is further configured to apply an output nonlinearity to the third weighted sum.

In some embodiments, the analog-electrical circuit is further configured to receive configuration data from a remote processing circuit and define each weight and offset based on the configuration data, wherein the remote processing circuit is configured to execute a machine learning algorithm to determine each weight and offset, wherein the machine learning algorithm comprises at least one of a neural network, a support vector machine, regression, Bayesian network, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization algorithm.

In some embodiments, the readout is a weighted sum of the at least one output response, the at least one output response comprising a plurality of output responses, wherein the weighted sum includes at least one second offset, and wherein each weight corresponding to the weighted sum and the at least one second offset are each one of a real number and a complex number.

In some embodiments, the at least one input to a first one or more of the computational units comprises at least one readout from at least one other computational unit of the computational units.

In some embodiments, the analog electrical-circuit is implemented using analog VLSI.

In some embodiments, the device uses the at least one output response to control operation of a robotic device using open loop control based on a linear transform of the readout or closed loop control.

In some embodiments, the device varies the one or more modulators to adjust for the at least one of compression or dilation of the at least one input, where the at least one input is at least one of compressed or dilated as a function of time.

In some embodiments, the device normalizes the at least one output response.

In some embodiments, at least one of the one or more modulators is computed as a nonlinear function of at least one of the at least one input and the at least one output.

In some embodiments, the one or more computational engines are a first one or more computational engines, and the device provides the at least one readout to a second one or more computational engines.

In some embodiments, the device performs recursive quadrature filtering.

In some embodiments, the device uses a plurality of recurrent weight matrices, each recurrent weight matrix multiplied by at least one of the one or more modulators.

BRIEF DESCRIPTION OF THE DRAWINGS

The details of one or more embodiments are set forth in the accompanying drawings and the description below. Other features, aspects, and advantages of the disclosure will become apparent from the description, the drawings, and the claims. In the drawings, like reference numerals are used throughout the various views to designate like components.

Figure 1:
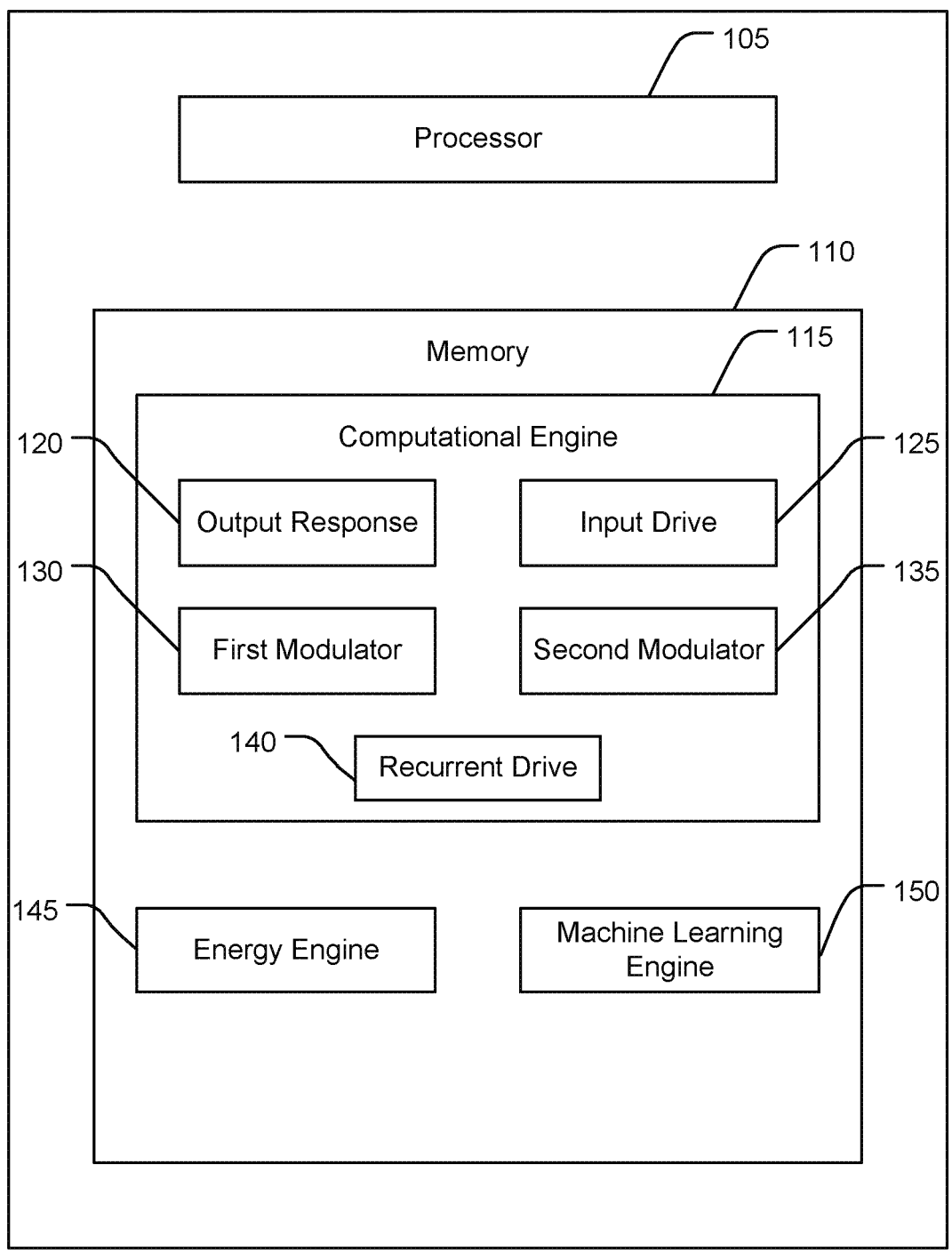
FIG. 1 illustrates a block diagram of a system for computation with recurrent neural networks according to an exemplary implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein and in the appended claims, singular articles such as "a" and "an" and "the" and similar references in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified. The expression "comprising" means "including, but not limited to."

Thus, other non-mentioned components or steps may be present. Unless otherwise specified, "a" or "an" means one or more.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations. Any numerical parameter should at least be construed in light of the number reported significant digits and by applying ordinary rounding techniques. The term "about" when used before a numerical designation, e.g., time and amount, indicates approximations which may vary by (+) or (−) 10%, 5% or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Embodiments are described in connection with exemplary prototypes which were used to generate the figures. The prototypes are capable of maintaining and manipulating information over time. The prototypes are capable of producing output signals that can be used to control systems and devices over time.

The present disclosure relates to systems, methods, and apparatuses for ORGaNICs (Oscillatory Recurrent GAted Neural Integrator Circuits). In some embodiments, ORGaNICs have all the capabilities of LSTMs, but ORGaNICs also have additional capabilities that surpass the capabilities of LSTMs. In comparison with LSTMs, ORGaNICs can be well-suited for processing oscillating signals comprised of damped oscillators, in which the amplitudes, frequencies and phases of the oscillators change over time (e.g., speech, music, human movement). ORGaNICs can also be well-suited for producing oscillating output signals that can be used to control systems and devices over time. ORGaNICs can be simpler to design than LSTMs because their functionality can be analyzed mathematically. As compared to LSTMs, ORGaNICs can be implemented with a simple analog electrical circuit, thereby offering favorable energy-efficiency. ORGaNICs can rescale the recurrent weight matrix to ensure stability and to avoid exploding gradients during learning. ORGaNICs can incorporate normalization to make the computation robust with respect to imperfections in the recurrent weight matrix. Normalization can maintain the ratios of the responses, unlike sigmoids or other static output nonlinearities (also called transfer functions) that are typically used in ML systems. ORGaNICs, unlike LSTMs, can have multiple recurrent weight matrices, each multiplied by different recurrent modulators. The modulators in ORGaNICs, analogous to the input and reset gates in LSTMs, can perform multiple functions. ORGaNICs that include multiple recurrent weight matrices are capable of performing combinations of these functions. This is unlike an LSTM that has only a single recurrent weight matrix and a single reset gate. ORGaNICs can offer a means for time warping. Invariance with respect to compression or dilation of temporal signals (e.g., fast vs. slow speech) is a challenge for many AI applications. ML systems typically attempt to circumvent this problem by learning models with every possible tempo. ORGaNICs can solve this problem much more efficiently, eliminating redundancy and increasing generalization, with less training.

A person of skill in the art will recognize that these systems, methods, and apparatuses can be used for analyzing a wide variety of signals including (but not limited to) text, speech, music, and images. A person of skill in the art will also recognize that these systems, methods, and apparatuses can be used to control a variety of systems and devices including (but not limited to) robotic manipulators. A person of skill in the art will also recognize that these systems, methods, and apparatuses have a variety of applications including (but not limited to) medicine and health care technology, financial technology, manufacturing and robotics, consumer technology, automobile technology, mobile technology, and internet technology.

In some embodiments, a method for computation using a recurrent neural network (e.g., a method for implementing an ORGaNIC with one or more of the advantages described above) includes receiving, by one or more computational units, an input drive and a recurrent drive; producing, by each of one or more modulators, at least one modulatory response; computing, by the one or more computational units, at least one output response using one or more computational units, each output response comprising a sum of: (1) the input drive multiplied by a function of at least one of the at least one modulatory response, each input drive comprising a function of at least one input, and (2) the recurrent drive multiplied by a function of at least one of the at least one modulatory response, each recurrent drive comprising a function of the at least one output response, each modulatory response comprising a function of at least one of (i) the one or more inputs, (ii) the at least one output response, or (iii) an offset; and computing a readout of the at least one output response, the readout comprising a function of the at least one output response. The method can be implemented using various hardware- and/or software-based systems, including using a computer program, an analog-electrical circuit, and/or an analog VLSI.

Referring now to FIG. 1, a block diagram of a system 100 for implementing a recurrent neural network (e.g., an ORGaNIC) is shown according to an embodiment of the present disclosure. The system 100 includes a processor 105 and a memory 110. The processor 105 can be implemented as a specific purpose processor, an application specific integrated circuit (ASIC), one or more field programmable gate arrays (FPGAs), a group of processing components, or other suitable electronic processing components. The processor 105 can be a distributed computing system or a multi-core processor. The memory 110 is one or more devices (e.g., RAM, ROM, flash memory, hard disk storage) for storing data and computer code for completing and facilitating the various user or client processes, layers, and modules described in the present disclosure. The memory 110 can be or include volatile memory or non-volatile memory and can include database components, object code components, script components, or any other type of information structure for supporting the various activities and information structures of the inventive concepts disclosed herein. The memory 110 is communicably connected to the processor 105 and includes computer code or instruction modules for executing one or more processes described herein. The memory 110 can include various circuits, software engines, and/or modules that cause the processor to execute the systems and methods described herein. The memory can be distributed across disparate devices.

In some embodiments, the memory 110 includes a computational engine 115 including an output response 120, an input drive 125, a first modulator 130, a second modulator 135, and a recurrent drive 140. The output response 120 can be generated based on the input drive 125 and recurrent drive 140, and can also be modulated based on the first modulator 130 and second modulator 135. The output response 120 is described in further detail below as the vector y. The input drive 125 can be a weighted sum of inputs, and is described in further detail below as the vector z. The recurrent drive 140 can be based on the output response 120, providing recurrence to the output response 120, and is described in further detail below as the vector ŷ. The first modulator 130 can be representative of a gain applied to the recurrent drive 140, in a manner analogous to a reset gate of a GRU, and is described in further detail below as the vector a. The second modulator 136 can be representative of a time constant of the output response 120, in a manner analogous to an update gate of a GRU, and is described in further detail below as the vector b. The computational engine 115 can execute a plurality of computational units (e.g., engines, modules, circuits), which can each cause a corresponding output response 120 to generate values based on the computational connections described herein.

In some embodiments, the memory 110 includes an energy engine 145. The energy engine 145 can be used to execute an energy function (see Eq. 1) for manipulating the output response 120. For example, the energy engine 145 can execute the energy function to drive the output response(s) 120 in a manner which minimizes the energy function.

The memory 110 can include a machine learning engine 150. The machine learning engine 150 can include one or more machine learning algorithms which, when executed, can be used to generate values for functions executed by the computational engine 115. For example, the machine learning engine 150 can be used to generate values for weights (e.g., weighting matrices) and/or offsets used to define the components of the computational engine 115. In some embodiments, the machine learning engine 150 is configured to execute at least one machine learning algorithm including but not limited to neural networks, support vector machines, regression, Bayesian networks, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization.

According to various embodiments described herein (e.g., as implemented by the system 100), an ORGaNIC includes one or more computational units, each of which performs a similar computation. Each computational unit can be implemented as a computational module, engine, or circuit. The output responses (e.g., output responses 120) of an ORGaNIC are represented by a vector y=($y_1$, $y_2$, . . . , $y_j$, . . . , $y_N$) where the subscript j indexes the elements of the vector, each corresponding to a different unit. Note that boldface lowercase letters represent vectors and boldface uppercase letters denote matrices. The output responses y depend on an input drive z (e.g., input drive 125) and a recurrent drive ŷ (e.g., recurrent drive 140). The responses y are also modulated by two other vector quantities: a (e.g., first modulator 130) and b (e.g., second modulator 135). The variables (y, ŷ, z, a, and b) are each functions of time, e.g., y(t), but the explicit dependence on t is left out of most of the equations to simplify the notation except when it is helpful to disambiguate time steps.

In some embodiments, ORGaNICs minimize an optimization criterion (e.g., an energy function) that represents a compromise between the input drive and the recurrent drive, over time:

$$E = \frac{1}{2}\int_t \sum_j \left(\frac{b_j^+}{1+b_j^+}\right)[y_j - z_j]^2 + \left(\frac{1}{1+b_j^+}\right)\left[y_j - \left(\frac{1}{1+a_j^+}\right)\hat{y}_j\right]^2 \quad (1)$$

$$\propto \frac{1}{2}\sum_t \sum_j \left(\frac{b_j^+}{1+b_j^+}\right)[y_j - z_j]^2 + \left(\frac{1}{1+b_j^+}\right)\left[y_j - \left(\frac{1}{1+a_j^+}\right)\hat{y}_j\right]^2$$

$$a_j^+ \geq 0 \text{ and } b_j^+ \geq 0$$

The superscript + indicates a rectifying output nonlinearity (e.g., f(x)=max(0, x)). Halfwave rectification can be used as a relatively simple or computationally inexpensive form of this rectifying nonlinearity, but other output nonlinearities could be substituted, e.g., sigmoid, exponentiation, halfsquaring (halfwave-rectification and squaring), normalization (see below), etc. The second line of Eq. 1 can be obtained by discretely sampling time and the proportionality constant is equal to the time step Δt.

In some embodiments, the responses are a dynamical process that minimizes the energy E over time. Taking derivatives of Eq. 1:

$$\tau_y \frac{dy_j}{dt} = -\frac{dE}{dy_j} = \quad (2)$$

$$-\left(\frac{b_j^+}{1+b_j^+}\right)[y_j - z_j] - \left(\frac{1}{1+b_j^+}\right)\left[y_j - \left(\frac{1}{1+a_j^+}\right)\hat{y}_j\right] = -\left(\frac{b_j^+}{1+b_j^+}\right)y_j +$$

$$\left(\frac{b_j^+}{1+b_j^+}\right)z_j - \left[1 - \left(\frac{b_j^+}{1+b_j^+}\right)\right]y_j + \left(\frac{1}{1+b_j^+}\right)\left(\frac{1}{1+a_j^+}\right)\hat{y}_j =$$

$$-y_j + \left(\frac{b_j^+}{1+b_j^+}\right)z_j + \left(\frac{1}{1+b_j^+}\right)\left(\frac{1}{1+a_j^+}\right)\hat{y}_j,$$

where $\tau_y$ is the intrinsic time-constant of the units. The recurrent drive $\hat{y}_j(t)$ depends on the responses $y_j(t-\Delta t)$ from an instant earlier in time, and the gradient $dE/dy_j$ is with respect to $y_j(t)$, for a specific time t, so the derivation does not apply the chain rule to $\hat{y}_j(t)$.

For some embodiments, it can be convenient to introduce a change of variables in Eq. 2:

$$\tau_y \frac{dy_j}{dt} = -y_j + \left(\frac{b_j^+}{1+b_j^+}\right)z_j + \left(\frac{1}{1+a_j^+}\right)\hat{y}_j. \quad (3)$$

For Eqs. 2 and 3 to be identical:

$$(1+a_j^+)=(1+b_j^+)(1+\alpha_j^+), \quad (4)$$

i.e., $$a_j^+=\alpha_j^+ b_j^+ +\alpha_j^+ +b_j^+.$$

Some embodiments enforce the constraint expressed by Eq. 4, but other embodiments allow $a_j$ to take on any value.

In some embodiments, the input drive depends on a weighted sum of the inputs:

$$z = W_{zx}x + c_z, \quad (5)$$

where $x=(x_1, x_2, \ldots, x_j, \ldots, x_M)$ is a vector representing the time-varying inputs. The encoding matrix $W_{zx}$ is an N×M matrix of weights and $c_z$ is an N-vector of additive offsets. These offsets, as well other offsets described throughout the disclosure, may be zero. The encoding matrix $W_{zx}$ and/or offsets of $c_z$ can be complex-valued. For some embodiments, the input weights in $W_{zx}$ and the offsets in $c_z$ are learned, using any of a plurality of machine-learning algorithms.

In some embodiments, the recurrent drive depends on a weighted sum of the responses:

$$\hat{y} = W_{\hat{y}y}y + c_{\hat{y}} \quad (6)$$

where the recurrent weight matrix $W_{\hat{y}y}$ is an N×N matrix and $c_{\hat{y}}$ an N-vector of additive offsets. The recurrent weight matrix and/or offsets can be complex-valued. For some embodiments, the recurrent weights and the offsets are learned, using any of a plurality of machine-learning algorithms. In some embodiments, $W_{\hat{y}y}$ is the identity matrix, such that each unit receives a recurrent excitatory connection from itself. In some embodiments, $W_{\hat{y}y}$ has a diagonal structure, such as a Toeplitz matrix arrangement. In some embodiments, values of the main diagonal and at least one pair of adjacent diagonals are non-zero while remaining values are zero, such that each unit receives recurrent connections from itself and its neighbors. In some embodiments, $W_{\hat{y}y}$ has a diagonal structure such that each row (or column) is a shifted copy of itself (as some examples, each row (or column) is a shifted copy of [0 . . . 0, 2, 1, 2, 0], [−0.1 . . . −0.1, −1, 0.5, 1, 0.5, −0.1, −0.1, . . . −0.1], [0 . . . 0, −0.5, 1, −0.5, 0, . . . 0]. In some embodiments, the recurrent weights have a center-surround architecture in which the closest recurrent connections are excitatory (positive weights), and the more distant ones are inhibitory (negative weights).

In some embodiments, the readout is a weighted sum of the responses:

$$r = W_{ry}y + c_r, \quad (7)$$

where $W_{ry}$ is a matrix of readout weights and $c_r$ is an N-vector of additive offsets. The readout weight matrix and/or offsets can be complex-valued. For some embodiments, the readout weights and the offsets are learned, using any of a plurality of machine-learning algorithms.

In some embodiments, the readout depends on the real part of the responses $r=Re(W_{ry}y+c_r)$. In some embodiments, the readout depends on the modulus of the responses $r=|W_{ry}y+c_r|$ or the squared modulus of the responses $r=|W_{ay}r+c_r|^2$. A person of skill in the art recognizes that any of a number of output nonlinearities (e.g., halfwave rectification, sigmoid, normalization) can be combined with any of the various options for the readout.

In various such embodiments, the modulators, a and b, are analogous to the reset gates and update gates, respectively, in a GRU. The time-varying value of each $b_j$ determines the effective time-constant of the corresponding response time-course $y_j$. The first term of E (Eq. 1) drives the output responses y to match the input drive x, and the second term drives the output responses to match the recurrent drive $\hat{y}$. Consequently, if $b_j$ is large then the response time-course $y_j$ is dominated by the input drive, and if $b_j$ is small then the response time-course is dominated by the recurrent drive. The time-varying value of $a_j$ determines the gain of the recurrent drive $\hat{y}_j$. If $a_j$ is large then the recurrent drive is shut down regardless of the value of $b_j$.

By way of comparison, a (leaky) neural integrator corresponds to embodiments in which $a_j=b_j=b$ is the same for all units j and constant over time, and $c_z=c_{\hat{y}}=0$. For these embodiments, Eq. 3 simplifies:

$$\tau_y \frac{dy}{dt} = -y + \lambda z + (1-\lambda)\hat{y} \quad (8)$$

$$\hat{y} = W_{\hat{y}y}y$$

$$\lambda = \left(\frac{b^+}{1+b^+}\right) \text{ and } (1-\lambda) = \left(\frac{1}{1+b^+}\right),$$

where $0 \le \lambda \le 1$. Even simpler is when $W_{\hat{y}y}=I$ (where I is the identity matrix):

$$\tau_y \frac{dy_j}{dt} = -y_j + \lambda z_j + (1-\lambda)y_j = \lambda(z_j - y_j), \quad (9)$$

i.e., $$\tau'_y \frac{dy_j}{dt} = -y_j + z_j \quad (10)$$

$$\tau'_y = \frac{\tau_y}{\lambda},$$

where $\tau_y$ is the intrinsic time-constant and $\tau'_y$ is the effective time-constant. For these embodiments, each unit acts like a shift-invariant linear system, i.e., a recursive linear filter with an exponential impulse response function. If the input drive $z_j$ is constant over time, then the responses $y_j$ exhibit exponential time courses with steady state $y_j=z_j$, and time constant $\tau'_y$. It will be appreciated that in such embodiments, $\lambda$, and consequently b, determines the effective time-constant of the leaky integrator. In most embodiments, however, the values of $a_j$ and $b_j$ can be different from one another, and different for each unit j, and both $a_j$ and $b_j$ vary over time. In some embodiments, $c_z$ and $c_{\hat{y}}$ are non-zero.

In some embodiments, the modulators a and b are themselves modeled as dynamical systems that depend on weighted sums of the inputs and outputs:

$$\tau_a \frac{da}{dt} = -a + W_{ax}x + W_{ay}y + c_a \quad (11)$$

$$\tau_b \frac{db}{dt} = -b + W_{bx}x + W_{by}y + c_b. \quad (12)$$

In some embodiments, the modulators are computed as weighted sums (Eqs. 11-12), followed by an output nonlinearity (e.g., rectification, sigmoid). A person of skill in the art recognizes that any of a number of output nonlinearities can be substituted. In other embodiments, the modulators are computed as nonlinear functions of the inputs and outputs. In some embodiments, the modulators are computed as weighted sums of the modulus of the inputs and/or weighted sums of the modulus of the outputs, such as by replacing x with |x| in Eqs. 11-12, and/or replacing y with |y| in Eqs. 11-12.

It will be appreciated that ORGaNICs process a time-varying input x to produce a time-varying vector of output responses y. In some embodiments, the output responses depend on a weighted sum of the inputs, and a recurrent weighted sum of their own responses. The output responses are also modulated by two time-varying modulators, a and b, which determine the effective time-constant and the recurrent gain. In some embodiments, each of these modulators depends on a weighted sum of the inputs and outputs. There are two nested recurrent circuits in these embodiments. First, the responses y depend on the recurrent drive ($\hat{y}$) which depends on a weighted sum of the responses. Second, the responses are modulated by a pair of modulators (a and b), each of which depends on a weighted sum of the responses.

The function computed by some embodiments can be expressed by the following system of discrete-time equations, looping over t in increments of $\Delta t$:

$$z(t) = W_{zx}x(t) + c_z \tag{13}$$

$$\hat{y} = W_{\hat{y}y}y + c_{\hat{y}}$$

$$\Delta a(t) = \frac{\Delta t}{\tau_a}[-a(t) + W_{ax}x(t) + W_{ay}y(t) + c_a]$$

$$a(t + \Delta t) = a(t) + \Delta a(t)$$

$$\Delta b(t) = \frac{\Delta t}{\tau_b}[-b(t) + W_{bx}x(t) + W_{by}y(t) + c_b]$$

$$b(t + \Delta t) = b(t) + \Delta b(t)$$

$$\Delta y_j(t) = \frac{\Delta t}{\tau_y}\left[-y_j(t) + \left(\frac{b_j(t)}{1 + b_j(t)}\right)z_j(t) + \left(\frac{1}{1 + a_j(t)}\right)\hat{y}_j(t)\right]$$

$$y(t + \Delta t) = y(t) + \Delta y(t)$$

The algorithm expressed by Eq. 13 is incremental, meaning that the system 100 may only need to store a vector of values for each of x, y, z, a, and b, while looping over time to update each of these vectors from one time step to the next. Note, however, that some embodiments store these variables as arrays so that the time courses of inputs, modulator responses, and output responses are stored over time throughout the loop.

Figure 2:
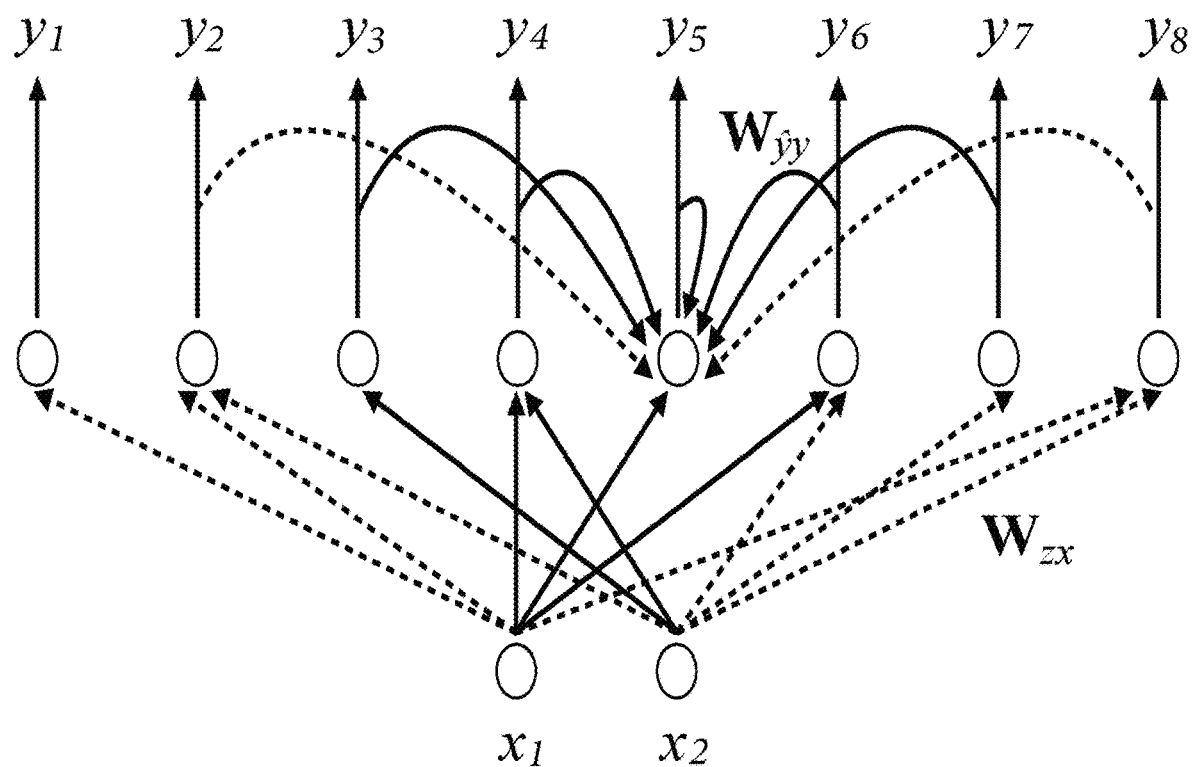
FIG. 2 illustrates a diagram of an illustrative recurrent neural network according to an exemplary implementation.

FIG. 2 shows a diagram of some of the connections of a computational unit in an example embodiment. As shown in FIG. 2, output responses $y_1 \ldots y_8$ are computed based on inputs $x_1$, $x_2$ (via input drives z, not labeled, using weight matrix $W_{zx}$) and recurrent drive $\hat{y}$ (based on recurrent weight matrix $W_{\hat{y}y}$). Solid lines/curves correspond to positive weights and dashed curves correspond to negative weights. Only a few of the recurrent connections are shown to minimize clutter. The modulatory connections are not shown.

Figure 3A:
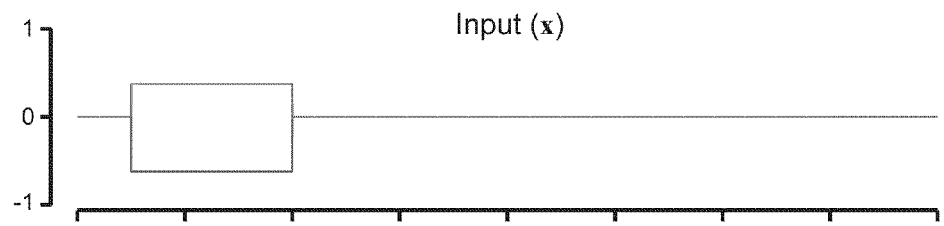
FIGS. 3A-3F illustrate inputs and outputs of the recurrent neural network of FIG. 2, as well as a recurrent weight matrix for the recurrent neural network of FIG. 2.
Figure 3B:
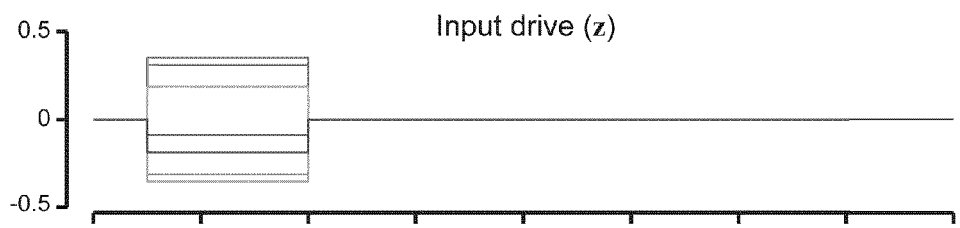
Figure 3C:
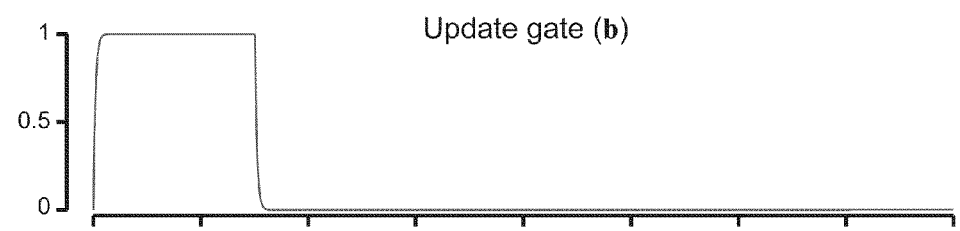
Figure 3D:
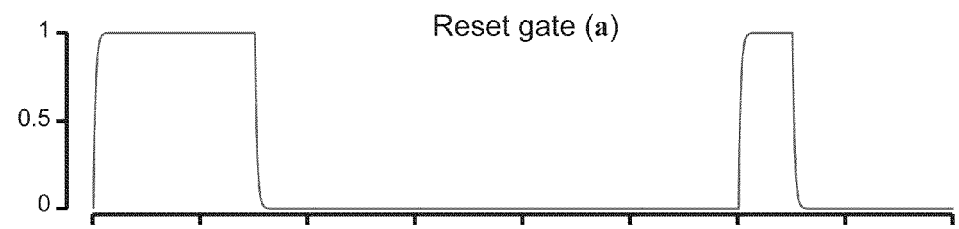
Figure 3E:
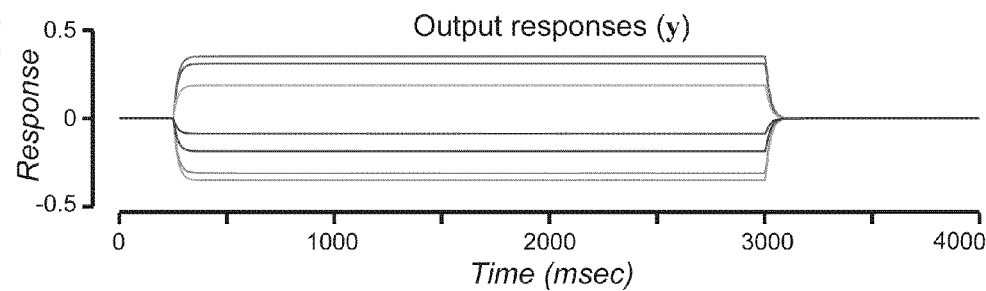
Figure 3F:
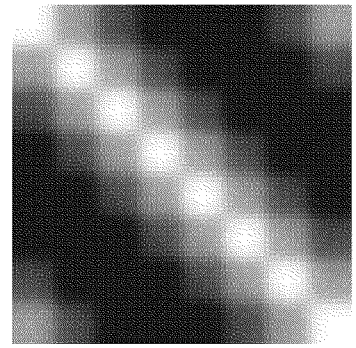

FIGS. 3A-3E shows the inputs and outputs of the example embodiment shown in FIG. 2. FIG. 3A shows the two components of the input (x) in which the curves 301, 302 depict the time courses of two input signals. FIG. 3B shows the time courses of the input drive (z). FIGS. 3C-3D show the time courses of the modulators (a and b). FIG. 3E shows the output responses (y). FIG. 3F shows the recurrent weight matrix ($W_{\hat{y}y}$). The values of the weights range from −0.1213 to 0.3640 (white, positive weights; black, negative weights).

The embodiment shown in FIGS. 3A-F uses the architecture depicted in FIG. 2 to store, during a delay period, information about the two-dimensional location of a target in an image. The input consisted of 4 time courses, the first two of which represented the presentation of the two-dimensional location of a target (FIG. 3A; curve 301, horizontal position; curve 302, vertical position). The input also consisted of the time-courses of two cues, one of which indicated a time shortly before the onset of the target (at time 0 ms) and the other of which indicated the end of the delay period (at time 3000 ms). The input drive (FIG. 3B) consisted of 8 time-courses, each of which was responsive to the polar angle location of the target. The encoding matrix, $W_{zx}$, was an 8×4 matrix:

$$W_{zx} = \begin{pmatrix} -0.5 & 0 & 0 & 0 \\ -0.3536 & -0.3536 & 0 & 0 \\ 0 & 0.5 & 0 & 0 \\ 0.3536 & 0.3536 & 0 & 0 \\ 0.5 & 0 & 0 & 0 \\ 0.3536 & -0.3536 & 0 & 0 \\ 0 & -0.5 & 0 & 0 \\ -0.3536 & -0.3536 & 0 & 0 \end{pmatrix} \tag{14}$$

The first two columns of $W_{zx}$ were, in fact, computed (for reasons explained below) as the first two eigenvectors of the recurrent weight matrix $W_{\hat{y}y}$. The weight matrices for a and b were chosen to reflect the other two inputs:

$$W_{ax} = \begin{pmatrix} 0 & 0 & 1 & 1 \\ 0 & 0 & 1 & 1 \\ 0 & 0 & 1 & 1 \\ 0 & 0 & 1 & 1 \\ 0 & 0 & 1 & 1 \\ 0 & 0 & 1 & 1 \\ 0 & 0 & 1 & 1 \\ 0 & 0 & 1 & 1 \end{pmatrix} \quad W_{bx} = \begin{pmatrix} 0 & 0 & 1 & 0 \\ 0 & 0 & 1 & 0 \\ 0 & 0 & 1 & 0 \\ 0 & 0 & 1 & 0 \\ 0 & 0 & 1 & 0 \\ 0 & 0 & 1 & 0 \\ 0 & 0 & 1 & 0 \\ 0 & 0 & 1 & 0 \end{pmatrix} \tag{15}$$

Consequently, the response time-courses of a and b followed the two cues (FIGS. 3C, 3D). The recurrent weights $W_{\hat{y}y}$ were chosen to have a center-surround architecture; each row of $W_{\hat{y}y}$ had a large positive value along the diagonal (self-excitation), flanked by smaller positive values, and surrounded by small negative values (FIG. 3F). The other weights and offsets were zero: $W_{ay}=0$, $W_{by}=0$, $c_z=0$, $C_a=0$, and $c_b=0$. The responses y followed the input drive z initially because a and b were large (=1, corresponding to a short effective time constant). The values of a and b were then switched to be small (=0, corresponding to a long effective time constant) before the target was extinguished, so the output responses y exhibited sustained output responses during the delay-period. Finally, the values of a were then switched to be large (=1, corresponding to a small recurrent gain), causing the output responses y to be extinguished. Target location was read out (at any time point during the delay period) by multiplying the responses with a pair of readout vectors:

$$\hat{x} = W_{ry}y + c_r = V^t y \tag{16}$$

$$V^t = \begin{pmatrix} -0.5 & -0.3536 & 0 & 0.3536 & 0.5 & 0.3536 & 0 & -0.3536 \\ 0 & -0.3536 & 0.5 & 0.3536 & 0 & -0.3536 & -0.5 & -0.3536 \end{pmatrix},$$

where the rows of $W_{ry}=V^t$ were (same as the first two columns $W_{zx}$) computed as the first two eigenvectors of the recurrent weight matrix $W_{\hat{y}y}$, and $c_r=0$.

In some embodiments, a "batch algorithm" that optimizes Eq. 1 for all time points at once can be executed (e.g., by computational engine 115). In some embodiments, the batch algorithm works in two steps (analogous to back-propagation), a forward pass and a backward pass. The forward pass is expressed by the following system of discrete-time equations:

$$z(t) = W_{zx}x(t) + c_z \quad (17)$$

$$\hat{y} = W_{\hat{y}y}y + c_{\hat{y}}$$

$$\Delta a(t) = \frac{\Delta t}{\tau_a}[-a(t) + W_{ax}x(t) + W_{ay}y(t) + c_a]$$

$$a(t + \Delta t) = a(t) + \Delta at$$

$$\Delta b(t) = \frac{\Delta t}{\tau_b}[-b + W_{bx}x(t) + W_{by}y(t) + c_b]$$

$$b(t + \Delta t) = b(t) + \Delta b(t)$$

The backward pass is:

$$\nabla E_j = \frac{\partial E}{\partial y_j(t)} = \left(\frac{b_j^*(t)}{1 + b_j^+(t)}\right)(y_j(t) - z_j(t)) + \quad (18)$$

$$\left(\frac{1}{1 + b_j^+(t)}\right)\left(y_j(t) - \left(\frac{1}{1 + a_j^+(t)}\right)\hat{y}_j(t)\right)$$

$$y(t) = y(t) - r\vec{\nabla}E$$

The algorithm proceeds by alternating between the forward pass and the backward pass. For the batch algorithm, each of x, y, z, a, and b are stored as arrays (each is a vector for any given time point, over all time points), and the entire array (over all time points) is updated during each iteration. This is different from the incremental algorithm (Eq. 13) which needs to store only a vector of values for each of the variables (x, y, z, a, and b), each of which is updated with each time step. The dynamics of the output responses are faster for the batch algorithm (compared to the incremental algorithm) because the batch algorithm does not include a time constant $\tau_y$ for the output responses.

In various embodiments of a recurrent neural network in accordance with the present disclosure and implemented as shown in FIGS. 2 and 3A-3F, the dynamics of the output responses depend on the eigenvalues and eigenvectors of the recurrent weight matrix $W_{\hat{y}y}$. For the illustrative embodiment shown in FIGS. 2 and 3A-3F, the recurrent weight matrix (FIG. 3F) is a symmetric, 8×8 matrix (N=8 is the number of output units in this embodiment). Two of the eigenvalues are equal to 1, two of them are 0, and the other 4 have values between 0 and 1. This recurrent weight matrix was in fact scaled so that the largest eigenvalues=1. The corresponding eigenvectors define an orthogonal coordinate system (or basis) for the responses.

The output responses during a delay period (when a=0, b=0, $c_z$=0 and $c_{\hat{y}}$=0) are determined entirely by the projection of the initial values (the responses at the very beginning of the delay period) onto the eigenvectors. Eigenvectors with corresponding eigenvalues equal to 1 are sustained throughout a delay period. Those with eigenvalues less than 1 decay to zero (smaller eigenvalues decay more quickly). In the embodiment shown in FIGS. 2 and 3A-3F, there are no eigenvectors with eigenvalues greater than 1. In an embodiment for which there are eigenvectors with eigenvalues greater than 1, then those components would be unstable, growing without bound (which is why the weight matrix in this embodiment was scaled so that the largest eigenvalues=1). So, in the embodiment shown in FIGS. 2 and 3A-3F, the steady-state output responses during the delay period depend on the dot products of the initial responses and the two largest eigenvectors:

$$p = V^t y_0$$

$$y_s = Vp, \quad (19)$$

where $y_s$ is the vector of steady-state output responses, $y_0$ is the vector of initial values at the beginning of the delay period, the rows of $V^t$ (Eq. 16) were computed as the first two eigenvectors of the recurrent weight matrix $W_{\hat{y}y}$, and p is the projection of $y_0$ on V. The same two eigenvectors were used to encode the input before the delay period:

$$y_0 = V x_0, \quad (20)$$

where the first two columns of $W_{zx}$ are equal to V, and $x_0$ is a 2×1 vector corresponding to the target position. The same two eigenvectors were used to perform the readout (Eq. 16). Consequently, the readout recovers the input (substituting from Eqs. 19-20 in Eq. 16):

$$\hat{x} = V^t y_s = V^t V p = V^t V V^t y_0 = V^t V V^t V x_0 = x_0, \quad (21)$$

where the last step simplifies to $x_0$ because V is an orthonormal matrix (i.e., $V^t V$=I). The steady-state output responses (and consequently the readout) are the same even when the encoding weights (the first two columns of $W_{zx}$) also include components that are orthogonal to V. Specifically, if the encoding weights are V+$V_p$ such that $V^t V_p$=0:

$$y_s = V V^t y_0 = V V^t (V + V_p) x_0 = V V^t V x_0 = V x_0$$

$$\hat{x} = V^t y_s = V^t V x_0 = x_0 \quad (22)$$

Likewise, the readout is unaffected by the offsets $c_z$ and $c_{\hat{y}}$, when they are orthogonal to V.

The embodiment depicted in FIGS. 2 and 3A-3F has a representational dimensionality d=2, because the recurrent weight matrix has two eigenvalues equal to 1. This embodiment is a two-dimensional continuous attractor during the delay period. It can maintain two values, corresponding to the horizontal and vertical locations of the target, where each of those values can be any real number.

Many AI applications, however, require manipulation of information in addition to maintenance of information. Such tasks and applications can take full advantage of the computational framework of ORGaNICs (by analogy with LSTMs). In some embodiments, the state of the ORGaNIC dynamically changes depending on the current context and past context (via $W_{zx}$, $W_{\hat{y}y}$, a, and b), and the dependence on past inputs and outputs is controlled separately for each unit (because the values of a and b may differ for each unit).

In some embodiments, the encoding and readout weights can have components that are not orthogonal to V, the offsets can have components that are not orthogonal to V, and the inputs and context can change dynamically before the responses reach steady state. A simple variant of the above embodiment provides an illustrative example: If one of the components of $c_{\hat{y}}$ is not orthogonal to V, then the corresponding component of the responses will reflect the elapsed time interval since the beginning of the delay period (i.e., it behaves like an integrator).

Some embodiments can be used to generate responses with complex dynamics. The key idea is that the weights and the output responses may be complex-valued. The complex-number notation is just a notational convenience. The complex-valued responses can be computed by pairs of units, and the complex-valued weights in the various weight matrices can be represented by pairs of numerical values (one representing the real part and other representing the imaginary part).

Figure 4A:
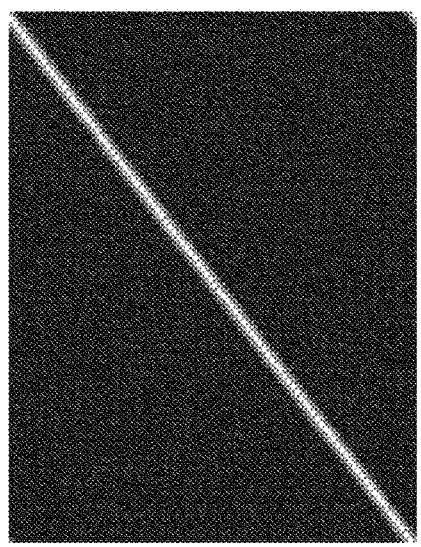
FIGS. 4A-4C illustrate a recurrent weight matrix and an example of outputs for an illustrative recurrent neural network with oscillatory output responses according to an exemplary implementation.
Figure 4B:
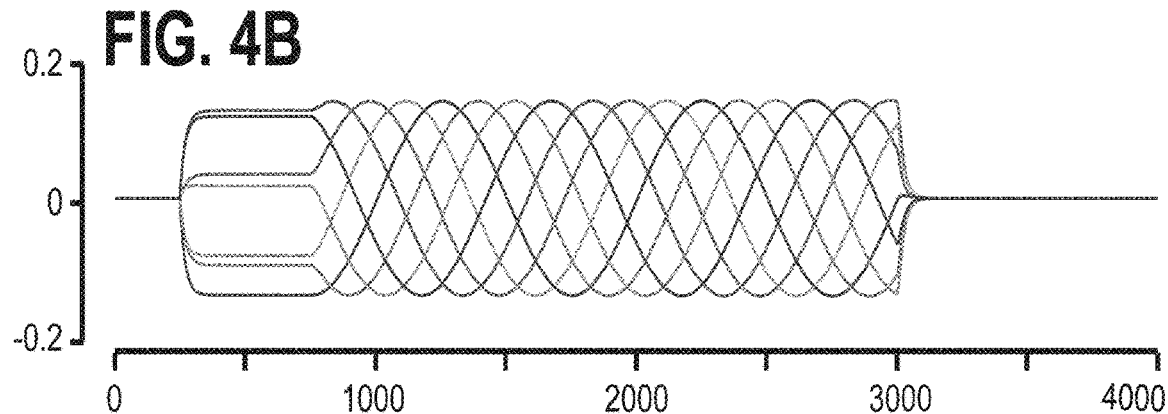
Figure 4C:
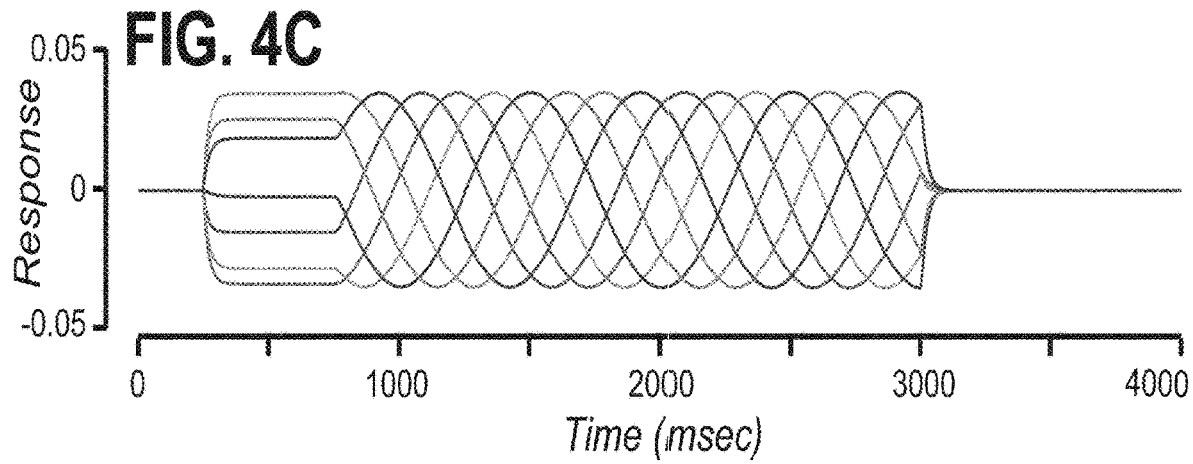

Some embodiments generate periodic output responses. A recurrent neural network according to the present disclosure and implemented as shown in FIGS. 4A-4B has 100 units. The recurrent weight matrix in this embodiment $W_{\hat{y}y}$ (a 100×100 matrix) contains 0's along the main diagonal and 1's along the diagonal adjacent to, and below, the main diagonal, as shown in FIG. 4A, looping back from the 100th unit to the 1st unit (FIG. 4A, top-right). Consequently, the activity is "handed off" from one unit to the next during a delay period. The encoding matrix is 100×4. Otherwise, this example network is the same as that depicted in FIGS. 2 and 3A-3F. FIGS. 4B-4C show that the responses are complex-valued and oscillatory during the delay period. FIG. 4B shows the real part of the complex-valued responses. FIG. 4C shows the imaginary part. Only a small fraction of the 100 response time-courses are shown in each of FIGS. 4B-4C to minimize clutter.

In various such embodiments, the dynamics of the output responses again depend on the eigenvalues and eigenvectors of recurrent weight matrix $W_{\hat{y}y}$. For the recurrent weight matrix shown in FIG. 4A, the eigenvalues and eigenvectors are complex-valued. Two of the eigenvalues have real parts equal to 1. The rest of the eigenvalues have real parts that are less than 1 (some of them being negative). The components of the responses corresponding to the 98 eigenvalues with real parts that are less than 1 decay to 0 during a delay period, so only the first two components are relevant for the steady-state output responses. The imaginary parts of the first two eigenvalues determine the oscillation frequencies. In this embodiment, the imaginary parts are small (±0.0629), corresponding to a slow frequency. The readout matrix in this embodiment can be computed as a unitary basis for the subspace spanned by the eigenvectors of $W_{\hat{y}y}$ with corresponding eigenvalues that had real parts=1. But the readout was computed as $r^+=|W_{ry}y|$, i.e., the modulus (square-root of the sum of squares of real and imaginary parts) of a weighted sum of the responses. The rows of $V^t$ are once again the same as the first two columns of the encoding matrix $W_{zx}$, computed as the first two (complex-valued) eigenvectors of the recurrent weight matrix $W_{\hat{y}y}$. Consequently, this circuit was capable of maintaining some (but not all) information about the input during the delay period. Only the absolute value of the input was read out (i.e., up to a sign change) in this embodiment, because the responses oscillate over time with a combination of frequency components (depending on the imaginary parts of the eigenvectors), and the frequency, phases, and elapsed time are presumed to be unknown.

Figure 5A:
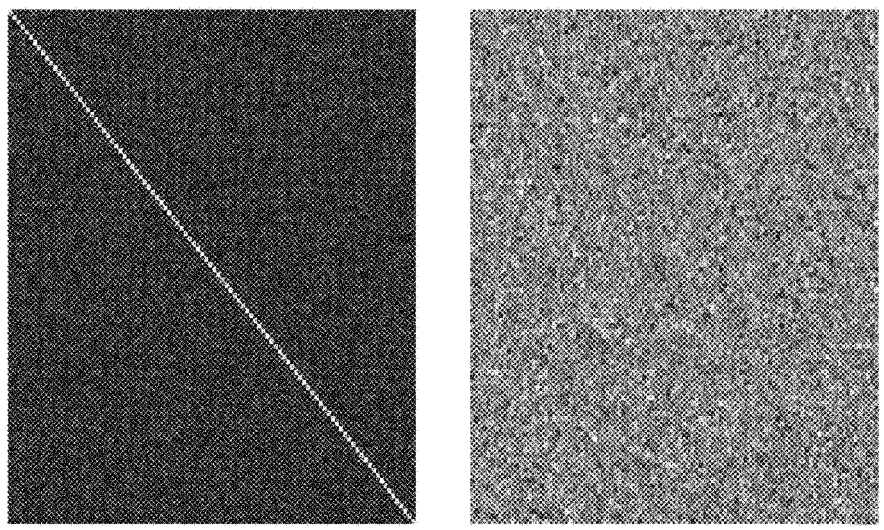
FIGS. 5A-5C illustrate a complex-valued recurrent weight matrix and an example of the outputs of an illustrative recurrent neural network with complex dynamics according to an exemplary implementation.
Figure 5B:
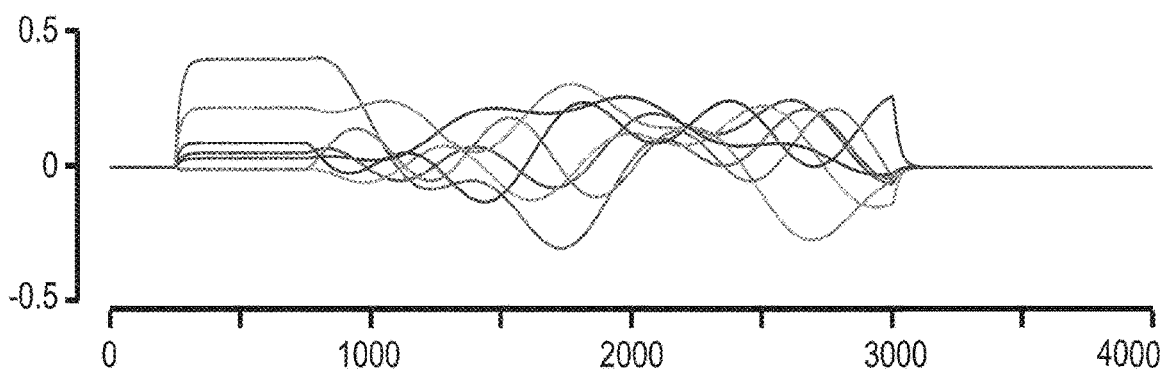
Figure 5C:
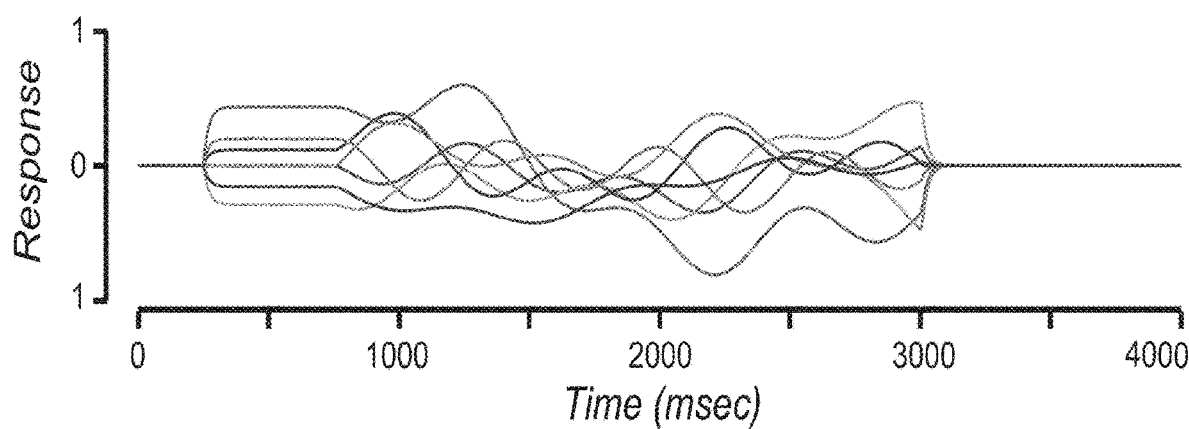

In various embodiments, a recurrent neural network in accordance with the present disclosure and implemented as shown in FIGS. 5A-5C exhibits complex dynamics. FIG. 5A shows the recurrent weight matrix ($W_{\hat{y}y}$). The left panel of FIG. 5A shows the real part of the complex-valued weight matrix (values of the weights range from −0.1 to 0.7; white, positive weights; black, negative weights). The right panel of FIG. 5A shows the imaginary part (values of the weights range from −0.1 to 0.1; white, positive weights; black, negative weights). FIGS. 5B-5C show the output responses (y). FIG. 5B shows the real part of the complex-valued responses. FIG. 5C shows the imaginary part. Only a small fraction of the 100 response time-courses are shown in each panel.

In embodiments according to FIGS. 5A-5B, there are again 100 units and the recurrent weight matrix $W_{\hat{y}}$ is a 100×100 matrix. The recurrent weight matrix in these embodiments was designed to have real parts of 10 eigenvalues equal to 1, real parts of the other 90 eigenvalues less than 1, and with small imaginary parts (between −0.1 and 0.1) for all 100 eigenvalues. Consequently, the steady-state responses have a representational dimensionality of d=10. $W_{zx}$ is a 100×12 matrix and V is a 100×10 matrix containing 10 eigenvectors. This embodiment has a representational dimensionality d=10, because the recurrent weight matrix was constructed to have 10 eigenvalues with real parts equal to 1. It is a ten-dimensional continuous attractor during the delay period, and it can in principle maintain ten values (e.g., the horizontal and vertical locations of 5 targets). In the preceding examples (FIGS. 3A-3F and 4A-4C), the recurrent weight matrices have only 2 eigenvalues with real parts equal to 1, so the representational dimensionality of those embodiments is only 2.

In this embodiment, the sign of the readout can be computed by estimating the frequencies, phases, and elapsed time. The readout depended not only on a weighted sum of the responses but also an estimate of the sign: $r^±=D(s)|r|$, where $r^±$ is the sign-corrected readout, and $r=W_{ry}y$ is the linear readout using the readout matrix $W_{ry}=V^t$. The vector s consists of ±1 values to correct the sign of the readout, and D(s) is a diagonal matrix such that each element of the vector s is multiplied by the corresponding element of $|r|$. The values of s can be computed from the responses y, sampled at two time points:

$$f_j = \frac{\phi_j(t_2) - \phi_j(t_1)}{2\pi(\Delta t)} \quad (23)$$

$$\phi_j(t) = \tan^{-1}\left(\frac{\text{Im}(r_j)}{\text{Re}(r_j)}\right)$$

$$\sum |s_j \hat{r}_j - r_j|^2$$

$$\hat{r}_j = e^{2\pi i T f_j}$$

$$s_j = \text{sgn}\left(\text{Re}\left(\frac{r_j}{\hat{r}_j}\right)\right),$$

where $r_j$ is the complex-valued response at time T, and $f_j$ is the instantaneous frequency. First, the instantaneous frequency of each quadrature pair of neural responses can be computed from the real- and imaginary-parts of the responses, using the first and second line of Eq. 23. The time interval $\Delta t = t_2 - t_1$ is presumed be known, although the values of $t_1$ and $t_2$ (i.e., the times at which the responses are sampled) are presumed to be unknown. Second, the elapsed time of the T can be estimated by minimizing the third line Eq. 23 (which depends on the last two lines of Eq. 23). Some embodiments sample a large number of values of T to determine an estimate for the elapsed time that is minimized by the third line of Eq. 23. Fourth, given that estimate of T, the response sign s can be computed using the last two lines of Eq. 23. There is a unique solution for s when at least two of the oscillation temporal periods have no common multiples. A person of skill in the art recognizes that a neural net can approximate the function that transforms from y to s, or from y to $r^±$.

Figure 6A:
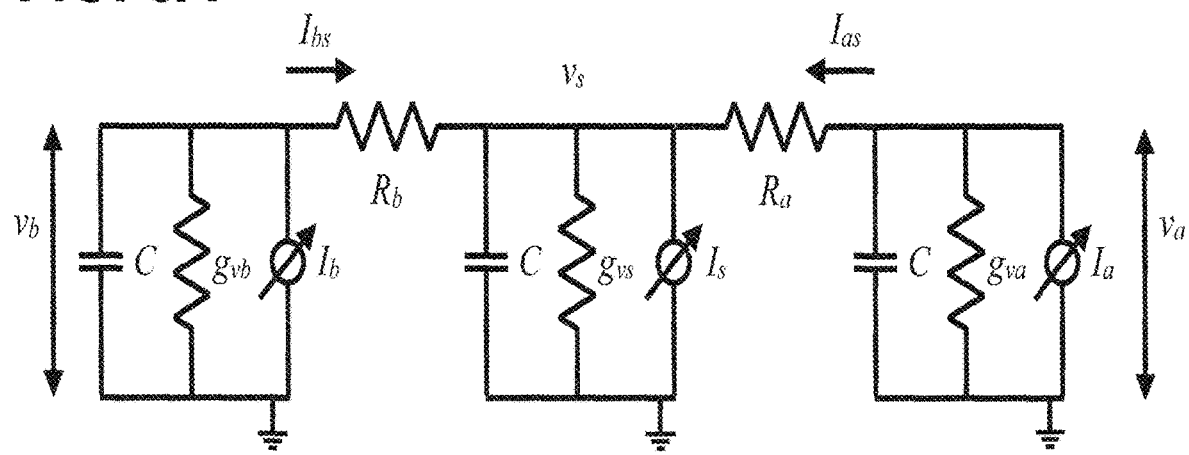
FIGS. 6A-6C illustrate an analog-electrical circuit that implements a computation of an illustrative recurrent neural network according to an exemplary implementation.
Figure 6B:
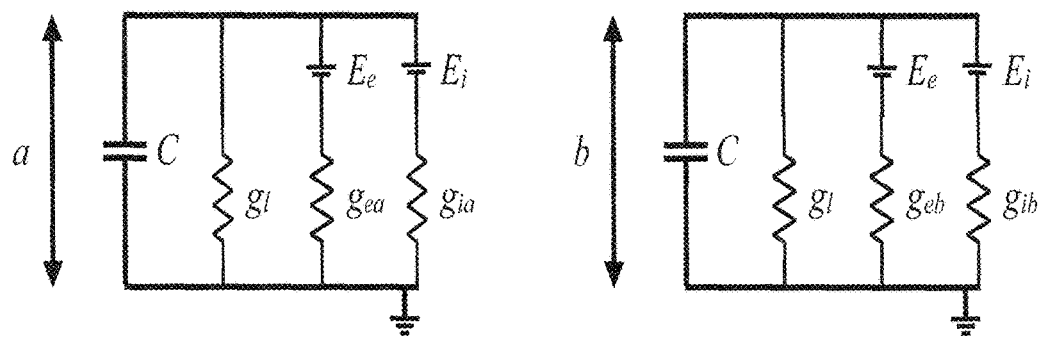
Figure 6C:
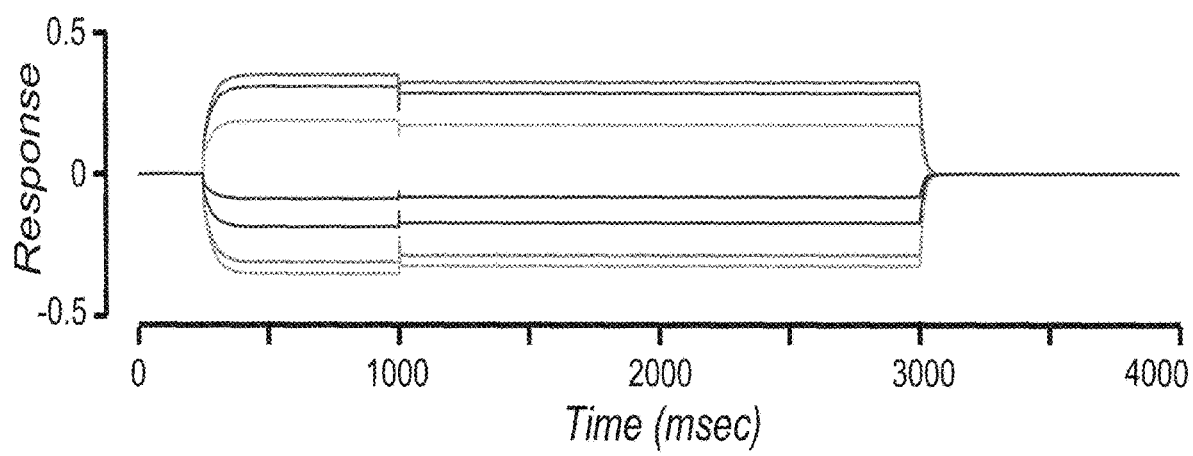

In some embodiments, a recurrent neural network in accordance with the present disclosure is implemented using an analog-electrical circuit 600. FIGS. 6A-6B show diagrams of the components of the analog electrical circuit 600, and FIG. 6C shows an example of the output responses of this embodiment. The circuit 600 in FIG. 6A includes 3 compartments. Each compartment can include an RC circuit with a variable-conductance resistor and a variable current source. Each current source approximates a linear combination of inputs. Each variable-conductance resistor ($g_{va}$, $g_{vb}$, and $g_{vs}$) represents a current shunt. The two fixed-conductance resistors labeled $R_a$ and $R_b$ represent the resistances between the compartments. Some embodiments include a voltage source (i.e., battery) in series with the variable-conductance resistors in each compartment. In some embodiments, the analog-electrical circuit is implemented using an analog VLSI. In some embodiments, the analog-electrical circuit is configured based on receiving configuration data (e.g., weight matrices, offsets) from a remote processing circuit, such as a remote processing circuit configured to execute any machine learning algorithm (or combination thereof) as described herein to generate the configuration data.

To analyze the function of the electrical-circuit 600 shown in FIG. 6A, the voltage in the central compartment can be expressed as a function of the inputs (the variable conductance resistors and the current sources in each compartment). From Kirchhoff's current law:

$$C\frac{dv_a}{dt} + g_{va}v_a - I_a + I_{as} = 0 \tag{24}$$

$$C\frac{dv_b}{dt} + g_{vb}v_b - I_b + I_{bs} = 0 \tag{25}$$

$$C\frac{dv_s}{dt} + g_{vs}v_s - I_s - I_{as} - I_{bs} = 0. \tag{26}$$

The voltage in the central compartment is denoted $v_s$, the voltage in the righthand compartment is denoted $v_a$, and the voltage in the lefthand compartment is denoted $v_b$. The currents flowing across each of the compartments are denoted $I_s$, $I_a$, and $I_b$. The internal currents flowing between compartments are denoted $I_{as}$ and $I_{bs}$. In addition, from Ohm's Law:

$$v_a - v_s = R_a I_{as} \tag{27}$$

$$v_b - v_s = R_b I_{bs}. \tag{28}$$

Substituting for $I_{as}$ and $I_{bs}$ in Eq. 26 from Eqs. 24-25:

$$\left(C\frac{dv_s}{dt} + g_{vs}v_s - I_s\right) + \left(C\frac{dv_a}{dt} + g_{va}v_a - I_a\right) + \left(C\frac{dv_b}{dt} + g_{vb}v_b - I_b\right) = 0. \tag{29}$$

The steady-state values for the voltages and internal currents, assuming that the inputs are constant over time, are derived by setting the derivatives equal to zero in Eqs. 24, 25, and 29:

$$-g_{va}v_a + I_a = I_{as} \tag{30}$$

$$-g_{vb}v_b + I_b = I_{bs} \tag{31}$$

$$g_{vs}v_s - I_s + g_{va}v_a - I_a + g_{vb}v_b - I_b = 0. \tag{32}$$

Substituting for the internal current $I_{as}$ from Eq. 30 into Eq. 27:

$$v_a - v_s = R_a I_{as} \tag{33}$$

$$v_a - v_s = R_a (I_a - g_{va}v_a)$$

$$v_a + R_a g_{va} v_a = v_s + R_a I_a$$

$$(1 + R_a g_{va}) v_a = v_s + R_a I_a$$

$$v_a = \frac{v_s + R_a I_a}{1 + R_a g_{va}} = \frac{v_s}{1 + R_a g_{va}} + \frac{R_a I_a}{1 + R_a g_{va}}$$

Likewise, substituting for the internal currents $I_{bs}$ from Eq. 31 into Eq. 28:

$$v_b = \frac{v_s}{1 + R_b g_{vb}} + \frac{R_b I_b}{1 + R_b g_{vb}}. \tag{34}$$

Substituting for $v_a$ and $v_b$ from Eqs. 33-34 into Eq. 32:

$$g_{vs}v_s - I_s + \frac{g_{va}}{1 + R_a g_{va}}v_s + \frac{R_a g_{va}}{1 + R_a g_{va}}I_a - \tag{35}$$

$$I_a + \frac{g_{vb}}{1 + R_b g_{vb}}v_s + \frac{R_b g_{vb}}{1 + R_b g_{vb}}I_b - I_b = 0$$

$$v_s\left(g_{vs} + \frac{g_{va}}{1 + R_a g_{va}} + \frac{g_{vb}}{1 + R_b g_{vb}}\right) =$$

$$I_s + I_a\left(1 - \frac{R_a g_{va}}{1 + R_a g_{va}}\right) + I_b\left(1 - \frac{R_b g_{vb}}{1 + R_b g_{vb}}\right)$$

$$v_s\left(g_{vs} + \frac{g_{va}}{1 + R_a g_{va}} + \frac{g_{vb}}{1 + R_b g_{vb}}\right) =$$

$$I_s + \left(\frac{1}{1 + R_a g_{va}}\right)I_a + \left(\frac{1}{1 + R_b g_{vb}}\right)I_b$$

Eq. 35 is an expression for the steady-state voltage $V_s$ in terms of the inputs ($I_s$, $I_a$, $I_b$, $g_{va}$, $g_{vb}$, and $g_{vs}$) and the fixed (constant) resistances ($R_a$ and $R_b$).

In some embodiments, the inputs ($I_s$, $I_a$, $I_b$, $g_{va}$, $g_{vb}$, and $g_{vs}$) to each unit are specified in terms of the input drive (y), recurrent drive ($\hat{y}$), and the modulators (a and b):

$$g_{va}(t) = 1/R_a a(t)$$

$$g_{vb}(t) = 1/R_b b(t)$$

$$I_s(t) = z(t),$$

$$I_b(t) = -z(t)$$

$$I_a(t) = \hat{y}(t) \tag{36}$$

and where $g_{vs}$ is presumed to be a constant. In some embodiments, the output is subjected to halfwave rectification:

$$y^+(t) = \lfloor v_s(t) \rfloor, \tag{37}$$

and the negative values (corresponding to hyperpolarlization of the membrane potential $v_s$) are represented by a separate unit that receives the complementary inputs (identical for $g_{va}$ and $g_{vb}$, and opposite in sign for $I_s$, $I_a$, and $I_b$). Substituting from Eq. 36 into Eq. 35:

$$v_s\left(g_{vs} + \frac{a}{R_a(1+a)} + \frac{b}{R_b(1+b)}\right) = z + \frac{1}{1+a}\hat{y} - \frac{1}{1+b(t)}z \tag{38}$$

$$g_{vs}v_s = \frac{b}{1+b}z + \frac{1}{1+a}\hat{y}, \tag{39}$$

where $g_v$ is the total conductance:

$$g_v = g_{vs} + \frac{a}{R_a(1+a)} + \frac{b}{R_b(1+b)}. \tag{40}$$

The steady-state voltage in the central compartment (Eq. 39) is a weighted sum of the input drive and recurrent drive, modulated by a and b, and then scaled by the total conductance. This is identical to the steady-state response of some of the embodiments above (compare Eq. 39 with Eq. 9) when the total conductance is $g_v$=1.

There are a variety of combinations of the various parameters of the circuit 600 for which the total conductance is approximately equal to 1. Two particular special cases correspond to when the modulators are both on, and when the modulators are both off. The first special case is as follows. For $g_{vs}$=1, a>>1, b>>1, $R_aR_b$>>1:

$$g_v \approx 1 + \frac{1}{R_a} + \frac{1}{R_b} = \frac{R_aR_b + 2}{R_aR_b} \tag{41}$$

$$\frac{1}{g_v} \approx \frac{R_aR_b}{R_aR_b + 2} \approx 1.$$

The second special case is as follows. For $g_{vs}$=1, a<<1, b<<1, $R_a$≥1, $R_b$≥1:

$$g_v \approx 1 + \frac{a}{R_a} + \frac{b}{R_b} = \frac{R_aR_b + R_ba + R_ab}{R_aR_b} \tag{42}$$

$$\frac{1}{g_v} \approx \frac{R_aR_b}{R_aR_b + R_ba + R_ab} \approx 1$$

In some embodiments, the modulators are also implemented with analog electrical-circuits. An example embodiment is shown in FIG. 6B. Each modulator unit is implemented as a single-compartment electrical circuit with conductance-based inputs:

$$C\frac{dv}{dt} = -g_l(v - E_l) - g_e(v - E_e) - g_i(v - E_i). \tag{43}$$

The leak conductance, excitatory conductance, and inhibitory conductance, are denoted $g_l$, $g_e$, and $g_i$, respectively. The corresponding electrical potentials are denoted $E_l$, $E_e$, and $E_i$. To simplify the notation (without loss of generality), choose $E_l$=0, $E_e$=1, and $E_i$=−1. Rewriting Eq. 43:

$$C\frac{dv}{dt} = -(g_l + g_e + g_i)v + g_e - g_i \tag{44}$$

$$\tau\frac{dv}{dt} = -v + \frac{g_e - g_i}{g},$$

where:

$$g = (g_l + g_e + g_i) \tag{45}$$

$$\tau = \frac{C}{g}. \tag{46}$$

To compute a linear summation of inputs x (or likewise a linear summation of x and y) followed by a saturating output nonlinearity, the conductances are specified to be:

$$g_e = \sum_k w_k^+ x_k^+ + w_k^- x_k^- \tag{47}$$

$$g_i = \sum_k w_k^+ x_k^- + w_k^- x_k^+,$$

where $w_k$ are the weights in the weighted sum, and where the superscript + and − mean halfwave rectification:

$$x_k^+ = \lfloor x_k \rfloor \text{ and } x_k^- = \lfloor -x_k \rfloor. \tag{48}$$

Subtracting the two lines of Eq. 47 gives linear summation:

$$g_e - g_i = \sum_k w_k^+ x_k^+ + w_k^- x_k^- - w_k^+ x_k^- - w_k^- x_k^+ \tag{49}$$

$$= \sum_k (w_k^+ - w_k^-)x_k^+ - (w_k^+ - w_k^-)x_k^-$$

$$= \sum_k w_k x_k^+ - w_k x_k^-$$

$$= \sum_k w_k x_k.$$

Substituting from Eq. 49 into Eq. 44 and solving for the steady state responses gives linear summation followed by a saturating nonlinearity:

$$v = \frac{g_e - g_i}{g} = \frac{1}{g}\sum_k w_k x_k. \tag{50}$$

Various embodiments described herein can be implemented with correspondingly different analog electrical circuits. Some embodiments, for example, comprise a plurality of input conductances in parallel, each of which is like those shown in FIG. 6B, and each of which corresponds to one of the terms in the summations in Eq. 47.

Some embodiments are capable of prediction over time by optimizing an optimization criterion (or energy function), analogous to Eq. 1, that can represent a compromise between the input drive and the recurrent drive, over time:

$$E = \frac{1}{2}\int_t \sum_j \left(\frac{b_j^+}{1+b_j^+}\right)\left[\sum_k \text{Re}(y_k) - x\right]^2 + \tag{51}$$

$$\left(\frac{1}{1+b_j^+}\right)\left[y_j - \left(\frac{1}{1+\alpha_j^+}\right)\hat{y}_j\right]^2 \propto$$

$$\frac{1}{2}\sum_t \sum_j \left(\frac{b_j^+}{1+b_j^+}\right)\left[\sum_k \text{Re}(y_k) - x\right]^2 +$$

$$\left(\frac{1}{1+b_j^+}\right)\left[y_j - \left(\frac{1}{1+\alpha_j^+}\right)\hat{y}_j\right]^2,$$

where the superscript + is a rectifying output nonlinearity. The second term in Eq. 51 is the same as Eq. 1. The first term in Eq. 51 constrains the sum of the output responses to be similar to the input x. As expressed here, the input is presumed to be real-valued which is why the real parts of the output responses are summed, but a person of skill in the art recognizes that complex-valued inputs can be handled by replacing the summation of the real parts of the output responses with a summation of the complex-valued output responses.

The output responses are (analogous to Eq. 2) modeled as dynamical processes that minimize the energy E over time:

$$\tau_y \frac{dy_j}{dt} = -\frac{dE}{dy_j} \quad (52)$$

$$= -\left(\frac{b_j^+}{1+b_j^+}\right)\left[\sum_k \text{Re}(y_k) - x\right] - \left(\frac{1}{1+b_j^+}\right)\left[y_j - \left(\frac{1}{1+\alpha_j^+}\right)\hat{y}_j\right]$$

$$= -y_j + \left(\frac{b_j^+}{1+b_j^+}\right)x + \left(\frac{1}{1+b_j^+}\right)\left(\frac{1}{1+\alpha_j^+}\right)\hat{y}_j +$$

$$\left(\frac{b_j^+}{1+b_j^+}\right)\left[y_j - \sum_k \text{Re}(y_k)\right].$$

Analogous to Eq. 3, we again introduce a change of variables:

$$\tau_y \frac{dy_j}{dt} = -y_j + \left(\frac{b_j^+}{1+b_j^+}\right)x + \left(\frac{1}{1+\alpha_j^+}\right)\hat{y}_j + \left(\frac{b_j^+}{1+b_j^+}\right)\left[y_j - \sum_k \text{Re}(y_k)\right]. \quad (53)$$

If the input x is complex-valued, then the last term depends on the sum of the complex-valued responses, not just the real parts, yielding:

$$\tau_y \frac{dy_j}{dt} = -y_j + \left(\frac{b_j^+}{1+b_j^+}\right)x + \left(\frac{1}{1+a_j^+}\right)\hat{y}_j - \left(\frac{b_j^+}{1+b_j^+}\right)\left(\sum_{k \neq j} y_k\right). \quad (54)$$

The first and third terms in each of Eqs. 53-54 are identical to Eq. 3. The second term in each of Eqs. 53-54 depends on the input x, but this could be replaced with the input drive z (where z=W$_z$x) so as to predict the input drive instead of the input, making it identical to the second term in Eq. 3. The last term in each of Eqs. 53-54 expresses mutual inhibition between each output response $y_j$ and the sum of the other output responses. Consequently, the outputs compete with one another to encode and predict the input over time.

Figure 7A:
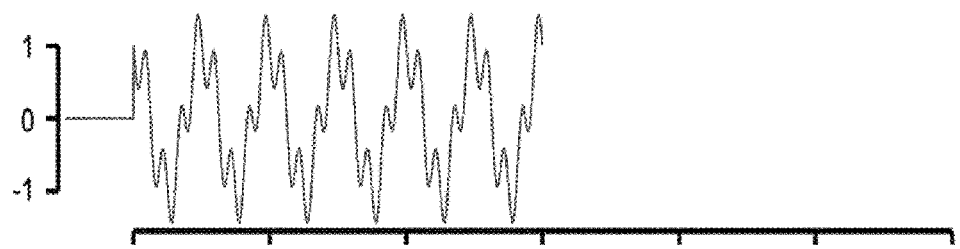
FIGS. 7A-7D illustrate example responses of an illustrative recurrent neural network that may be used for time-series prediction.
Figure 7B:
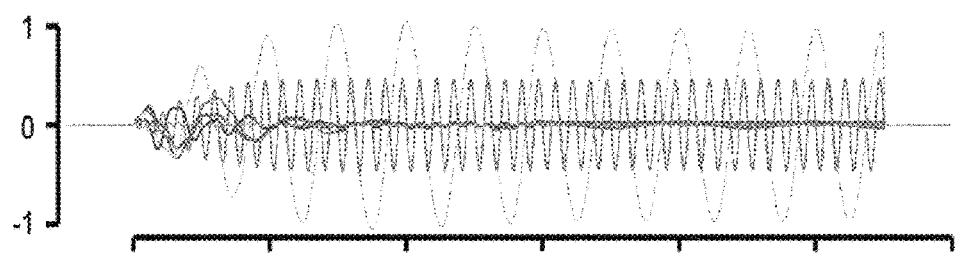
Figure 7C:
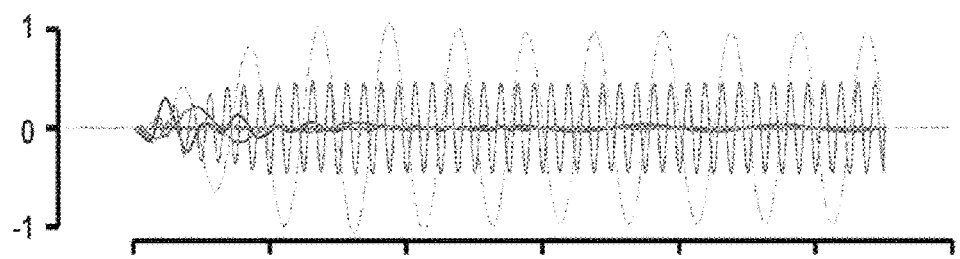
Figure 7D:
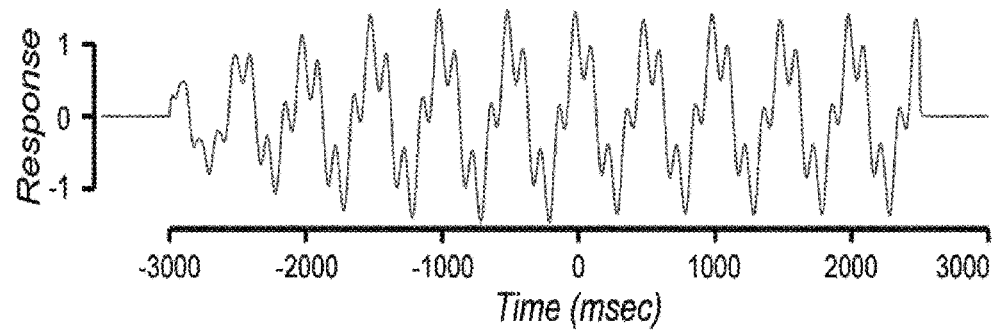

In some embodiments, recurrent neural networks in accordance with the present disclosure and implemented as shown in FIGS. 7A-7D can be used for time-series prediction. FIG. 7A shows an input x(t) that was a periodic time series, a sum of sinusoids, until t=0 and then nonexistent for t>0. The recurrent neural network was constructed with 6 pairs of output responses, corresponding to the real and imaginary parts of $y_j$(t). The recurrent weight matrix was a diagonal matrix with the real parts of all 6 eigenvalues equal to 1, and with imaginary parts corresponding to 6 different temporal frequency (0, 1, 2, 4, 8, and 16 Hz). Specifically:

$$w_j = 1 + i2\pi\omega_j\tau_y, \quad (55)$$

where $w_j$ are the complex-valued weights along the diagonal of the recurrent weight matrix, and $\omega_j$ are the 6 temporal frequencies. This diagonal recurrent weight matrix could, of course, be replaced with a more generic recurrent weight matrix (e.g., analogous to that shown in FIG. 5A), with the same complex-valued eigenvalues. The modulators ($a_1$ and $b_j$) were set to the same nonzero value (0.01) at a time corresponding to the onset of the input (t=−3000) so that the responses followed the input. Both modulators were set to 0 for t>0 so that the responses continued in spite of the lack of input. Finally, the $a_j$ modulators were set to 1 at t=2500 to reset the responses. FIGS. 7B-7C shows the output responses. The input, shown in FIG. 7A, was real valued. The output responses shown in FIGS. 7B-7C were complex-valued because the weights were complex-valued. FIG. 7D shows the sum of the real parts of the responses, i.e., the sum of the curves shown in FIG. 7B. The time-series prediction shown in FIG. 7D was computed by summing the real parts of the output responses across the 6 temporal frequencies.

For fixed values of the modulators, each (complex-valued) pair of output responses acts like a shift-invariant linear system (i.e., a recursive linear filter). The predicted responses can be computed recursively, but they can also be expressed as a sum of basis functions called the "predictive basis functions". The predictive basis functions (damped oscillators of various temporal frequencies) are the impulse response functions of these shift-invariant linear systems, each corresponding to a different eigenvector/eigenvalue. For a diagonal recurrent weight matrix like that used to compute the output responses shown in FIGS. 7B-7C, each predictive basis function also corresponds to a complex-valued pair of output responses indexed by j. Given a complex-valued pair of output responses at only one instant in time, the predicted responses over time are proportional to the predictive basis functions, scaled by the responses at that instant in time. Given the output responses over time up to a current instant in time, the predicted responses can be expressed as a sum of scaled copies of the predictive basis functions. For example, one pair of output responses shown in FIGS. 7B-7C correspond to a temporal frequency of 0 Hz; the predictive basis function is an exponential decay, the response $y_j$(t) is a low-pass filtered (blurred over time) copy of the input x(t), and the values of the modulators ($a_1$ and $b_j$) determine the amount of blurring.

A person of skill in the art recognizes that some embodiments can be used to predict forward in time by any desired time step. Because the predictive basis functions are damped oscillators of various temporal frequencies. As a simple illustrative example, if the state of the system at time t can be expressed as sin(ωt+φ), then the output response at a later time is sin[ω(t+Δt)+φ], where Δt is the time step.

Figure 8A:
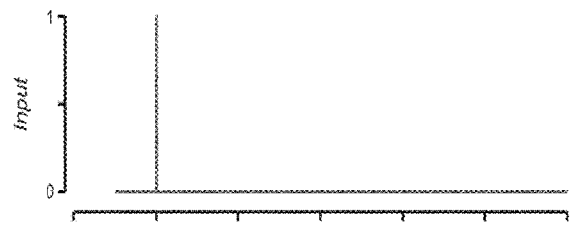
FIGS. 8A-8C illustrate example responses of an illustrative recurrent neural network that may be used for recursive quadrature filtering.
Figure 8B:
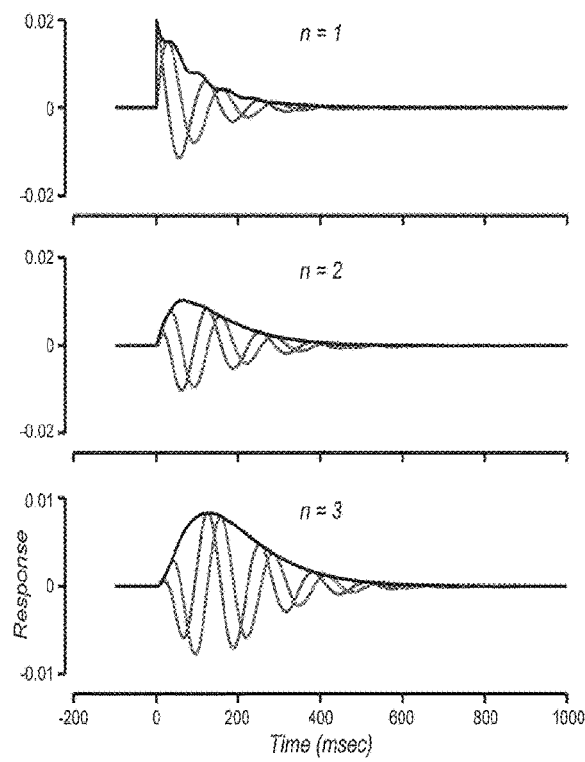
Figure 8C:
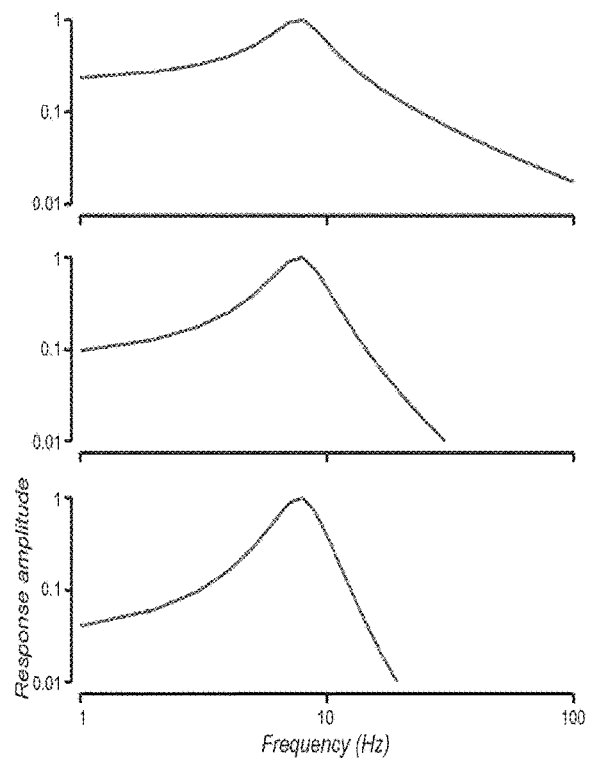

In some embodiments, recurrent neural networks in accordance with the present disclosure and implemented as shown in FIGS. 8A-8C can be used for recursive quadrature filtering. For real-valued inputs, the output responses of the filter are:

$$\tau \frac{dy}{dt} = -y + \lambda(x + \text{Im}(y)) + (1-\lambda)\hat{y} \quad (56)$$

$$\hat{y} = wy$$

$$w = 1 + i2\pi\tau\omega,$$

where x(t) is the input and y(t) is the output. The value of λ determines the effective time constant (see Eq. 10), and the value of ω determines the preferred temporal frequency.

For complex-values inputs, the output responses of the filter are:

$$\tau \frac{dy}{dt} = -y + \lambda x + (1-\lambda)\hat{y}, \quad (57)$$

where $\hat{y}$ is defined as in Eq. 56.

The filter can be cascaded, analogous to cascading a standard exponential lowpass filter. The response of the $n^{th}$ filter in the cascade is:

$$\tau_n \frac{dy_n}{dt} = -y_n + \lambda_n y_{n-1} + (1-\lambda_n)\hat{y}_n \quad (58)$$
$$\hat{y}_n = w_n y_n$$
$$w_n = 1 + i2\pi\tau_n\omega_n,$$

where the response of the first filter in the cascade is:

$$\tau_1 \frac{dy_1}{dt} = -y_1 + \lambda_1(x + \mathrm{Im}(y_1)) + (1-\lambda_1)\hat{y}_1. \quad (59)$$

FIGS. 8A-8C show example responses of an embodiment for recursive quadrature filtering. FIG. 8A is an input impulse signal that is non-zero only for t=0. FIG. 8B shows the responses of a cascade of 3 recursive quadrature filters. Each successive row in FIG. 8B corresponds to a different value of n. Also shown in FIG. 8B is the modulus of the responses $|y_n|$. FIG. 8C shows the amplitude of the frequency response corresponding to each of the 3 filters in the cascade. For the depicted examples, the parameter values were same for each filter in the cascade: $\tau_n$=1 ms, $\omega_n$=8 Hz, and $\lambda_n$=0.02.

In some embodiments, a recurrent neural network in accordance with the present disclosure is configured to generate signals, such as to control or execute an action or a sequence of actions (e.g., for controlling a robot). Some actions are ballistic (open loop), meaning that they are executed with no sensory feedback. Others are closed loop, meaning that the movements are controlled based on sensory feedback (e.g., sensory feedback provided as part of the input x). ORGaNICs can produce patterns of output responses over time for the execution and control of both open- and closed-loop movements.

Figure 9A:
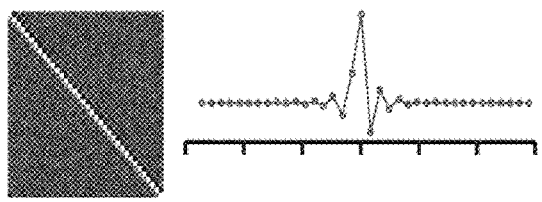
FIGS. 9A-9J illustrate a recurrent matrix and examples of the outputs of an illustrative recurrent neural network that may be used to generate signals for open-loop control according to an exemplary implementation.
Figure 9B:
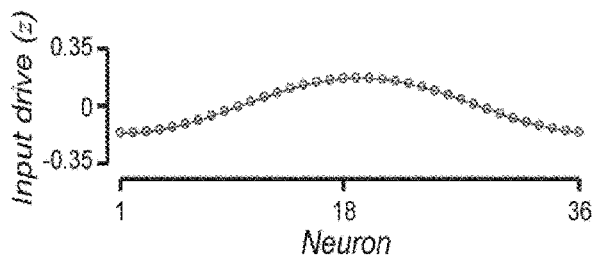
Figure 9C:
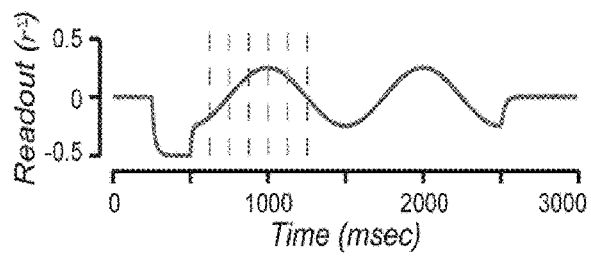
Figure 9D:
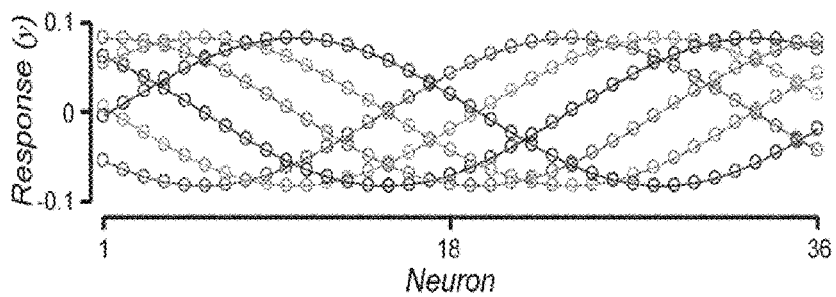
Figure 9E:
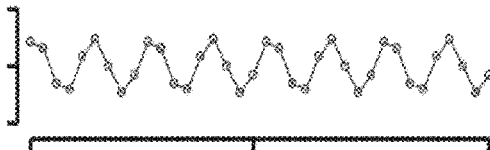
Figure 9F:
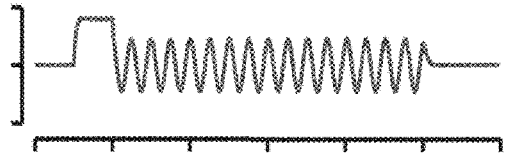
Figure 9G:
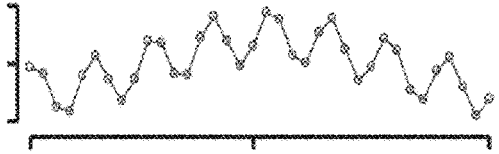
Figure 9H:
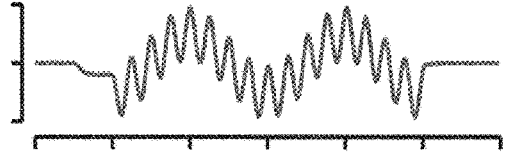

In some embodiments, recurrent neural networks in accordance with the present disclosure and implemented as shown in FIGS. 9A-9J can be used for open-loop control during a delay-period. FIG. 9A shows the recurrent weight matrix that was used for an example embodiment. The recurrent weight matrix was a 36×36 real-valued matrix. In particular, the recurrent weight matrix was computed as the sum of two matrices: 1) an identity matrix; 2) a discrete approximation to a derivative. Because this recurrent weight matrix was asymmetrical, the eigenvectors and eigenvalues of the recurrent weight matrix were complex-valued, and the output responses exhibited oscillatory dynamics. The readout for this example embodiment computed the sum of the real parts of the output responses. FIGS. 9B, 9C, and 9E-9J show examples of inputs and readouts for this example embodiment. FIGS. 9B, 9E, 9G, and 9I show the input drives and FIGS. 9C, 9F, 9H, and 9J show the corresponding readouts. Different spatial patterns of inputs led to different temporal dynamics in the readouts. When the input drive was chosen to drive a particular eigenvector of the recurrent weight matrix (i.e., because the input drive was orthogonal to the other eigenvectors), then the readout during the period of motor execution was a 1 Hz sinusoid, as shown in FIGS. 9B-9C. FIG. 9D shows the responses corresponding to the input drive shown in FIG. 9B and the readout shown in FIG. 9C. When the input drive was chosen to drive another eigenvector, then the readout was an 8 Hz sinusoid, as shown in FIGS. 9E-9F. A linear sum of these inputs evoked a linear sum of the readouts, as shown in FIGS. 9G-9H.

Each eigenvector of the recurrent weight matrix can be associated with a basis function, which can be a function defining a pattern of activity across the population of neurons and over time. Each basis function is a complex exponential (e.g., including sine and cosine terms), the frequency of which is specified by the imaginary part of the corresponding eigenvalue:

$$f_i = \left(\frac{1000}{2\pi\tau_y}\right)\mathrm{Im}(\lambda_i). \quad (60)$$

The value of $\lambda_i$ is the imaginary part of the $i^{th}$ eigenvalue of the recurrent weight matrix, and f is the corresponding oscillation frequency (in Hz). The factor of 1000 is included in Eq. 60 because the time constant $\tau_y$ is specified in msec while the oscillation frequency is specified in Hz (cycles/sec).

Figure 9I:
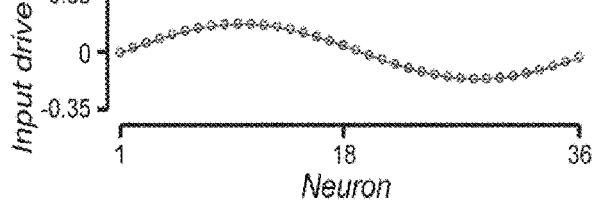
Figure 9J:
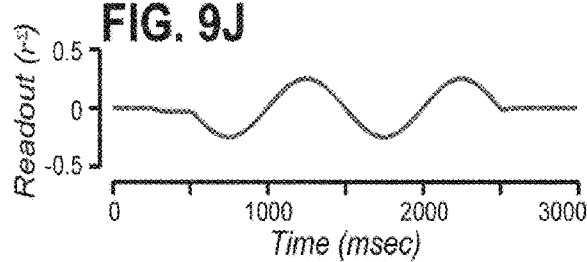

The output responses of this embodiment exhibited an oscillating traveling wave as shown in FIG. 9D: the response of any individual unit oscillates over time and the entire pattern of activity shifts over time. For inputs corresponding to different eigenvectors, the responses oscillate at correspondingly different frequencies, as shown by comparing FIGS. 9C and 9F. The frequencies of the various components corresponding to each of the eigenvalues, for this particular recurrent weight matrix, included a number of other frequencies in addition to the 1 and 8 Hz components shown in the figure. Motor control signals with any arbitrary phase, for each of the frequency components, can be generated by shifting the input drive, as shown in FIGS. 9I-9J. That way, all combinations of frequencies and phases can be generated by changing the spatial pattern of input drive, with a fixed, linear readout.

The readout for this example embodiment is a linear sum of the responses. Linear sums of sinusoidal and cosinusoidal basis functions can be used as control signals for ballistic (open loop) movements. The readout for open-loop control can be, in various such embodiments, an arbitrary linear transform of the responses: $W_{ry}y$. The readout matrix, in some embodiments as discussed above, can be comprised of the eigenvectors of the recurrent weight matrix. Doing so ensures that an input can be recovered (up to a sign change) at any time during a delay period, but recovering the input is not necessarily the goal for open-loop control.

Some embodiments of recurrent neural networks in accordance with the present disclosure can be used for closed-loop control. The basis functions are damped oscillators when the modulators are greater than 0 but equal to one another (a=b) and constant over time, and when the input is constant over time. If the input is varying over time, then the responses depend on a linear combination of the inputs and the basis functions, and the responses can be used for closed-loop control. In some embodiments, the modulators (a and b) are also time-varying.

A challenge for motor control (e.g., in robotics applications) is to generate movements at different speeds. Likewise, a challenge for sensory processing (e.g., in computer vision or sound processing applications) is that perception must be invariant with respect to compression or dilation of temporal signals, e.g., recognizing fast vs. slow speech.

In some embodiments, recurrent neural networks in accordance with the present disclosure and implemented as shown in FIGS. 10A-10I can be used for time warping (also time reversal), by making use of the modulators. The embodiment shown in FIGS. 10A-10I used three recurrent weight matrices. The first recurrent weight matrix, shown in FIG. 10A, was chosen to have a center-surround architecture. Each row of the matrix had a large positive value along the diagonal (self-excitation), flanked by smaller positive values, and surrounded by small negative values. Specifically, this recurrent weight matrix was a 36×36 matrix, designed based on quadrature-mirror filter wavelets. Quadrature-mirror filters are mutually orthogonal when shifted or scaled by factors of 2. Consequently, the rows of the matrix were shifted copies of one another (such that the matrix was convolutional), but all the even (or odd) rows of the matrix were mutually orthogonal so that the 36 rows of the recurrent weight matrix, corresponding to the 36 output responses, spanned a 19-dimensional subspace. The second recurrent weight matrix, shown in FIG. 10B, was a discrete approximation to the derivative. The third recurrent weight matrix, shown in FIG. 10C, was the negative derivative matrix (i.e., the second and third recurrent matrices differed from one another by a factor of −1).

Figure 10A:
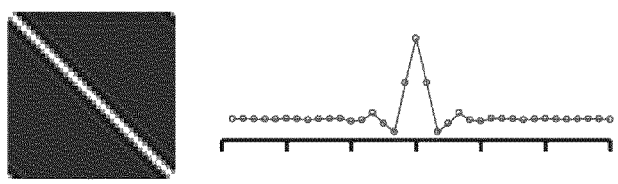
FIGS. 10A-10I illustrate a combination of recurrent weight matrices and examples of the outputs of an illustrative recurrent neural network that enables time warping and time reversal.
Figure 10B:
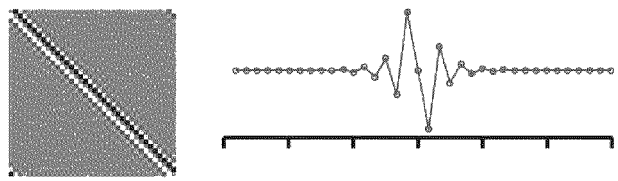
Figure 10C:
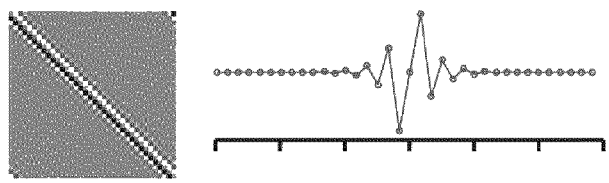
Figure 10D:
Figure 10E:
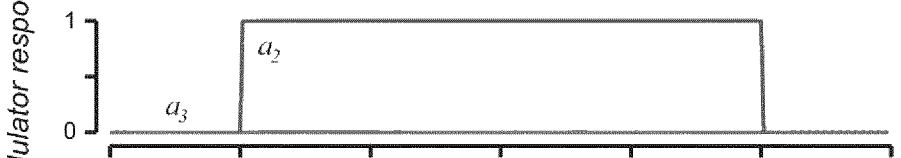
Figure 10F:
Figure 10G:
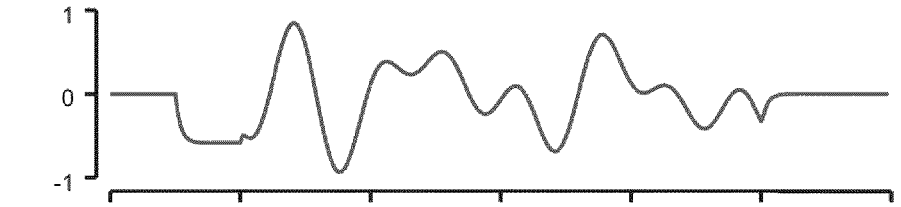
Figure 10H:
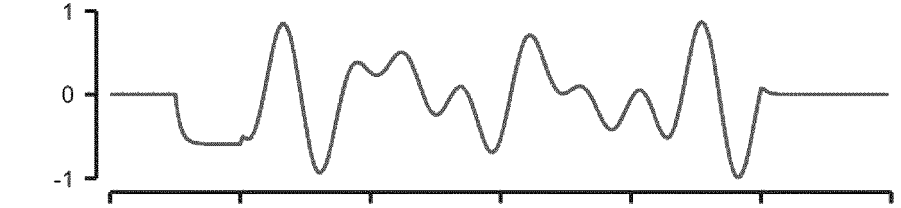
Figure 10I:
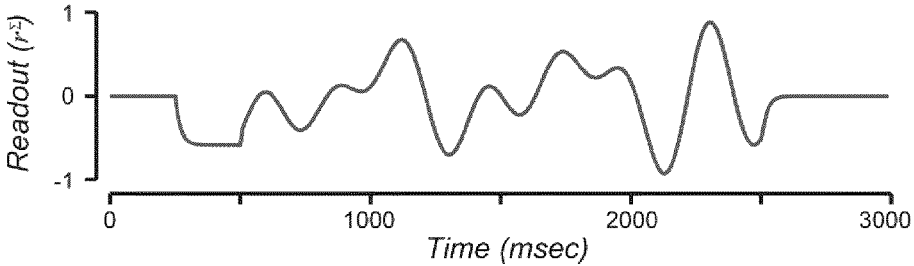

The modulators in this embodiment, shown in FIGS. 10D-10F, were the same for each unit in the network. Consequently, the computation performed by this network can be expressed by modifying Eq. 3:

$$\tau_y \frac{dy}{dt} = -y + \left(\frac{b^+}{1+b^+}\right)z + \left(\frac{1}{1+a_1^+}\right)\hat{y}_1 + \left(\frac{a_2^+}{1+a_2^+}\right)\hat{y}_2 + \left(\frac{a_3^+}{1+a_3^+}\right)\hat{y}_3 \quad (61)$$

$$\hat{y}_k = W_{y\hat{y}_k} y$$

where the subscript k indexes over the 3 recurrent weight matrices. Some embodiments use more than 3 recurrent weight matrices, each multiplied by a recurrent modulator, and some embodiments (unlike that expressed by Eq. 61) comprise different modulators for each unit.

The readout in this example embodiment summed across all of the output responses (same as for the example embodiment illustrated by FIG. 9).

For the example embodiment shown in FIGS. 10A-10I, the input was chosen to drive the eigenvectors of the first recurrent weight matrix with randomly chosen amplitudes and phases. Different values of the $a_2$ and $a_3$ modulators generated control signals that were time warped and/or time reversed. Increasing the modulator from 1 to 5/3 caused the readout to increase in tempo by 25%, as shown by comparing FIGS. 10G and 10H. Tempo was proportional to $a_2/(1+a_2)$. When $a_2$ was zero and $a_3$ was non-zero, then the readout was time reversed, shown by comparing FIGS. 10G and 10I. A time-varying modulator generated time-varying time-warping (not shown). The network exhibited these phenomena because the responses exhibited oscillating traveling waves, like those shown in FIG. 9D. The readout was a sum of these traveling waves, and the speed of the traveling waves was controlled by the modulators.

The example embodiments discussed thus far depended on precisely tuned synaptic weights. The recurrent weight matrices were scaled so that the eigenvalues had real parts no greater than 1. If the recurrent weight matrix has eigenvalues with real parts greater than 1, then the responses are unstable, growing without bound during a delay period. A solution to this problem is to combine ORGaNICs with normalization.

Figure 11A:
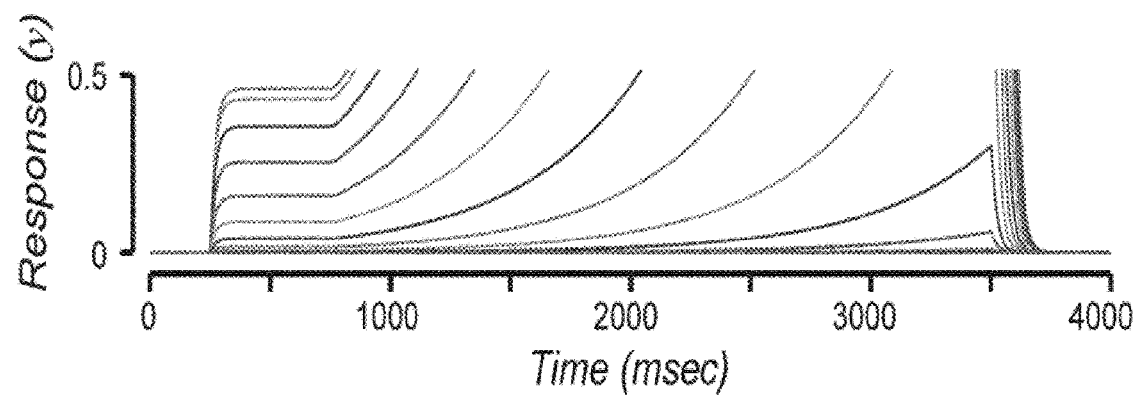
FIGS. 11A-11C illustrate examples of the outputs of an illustrative recurrent neural network with and without recurrent normalization.
Figure 11B:
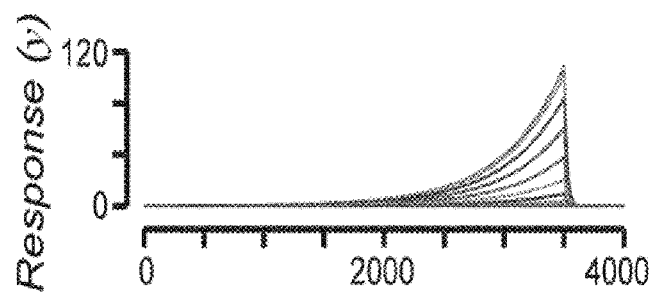
Figure 11C:
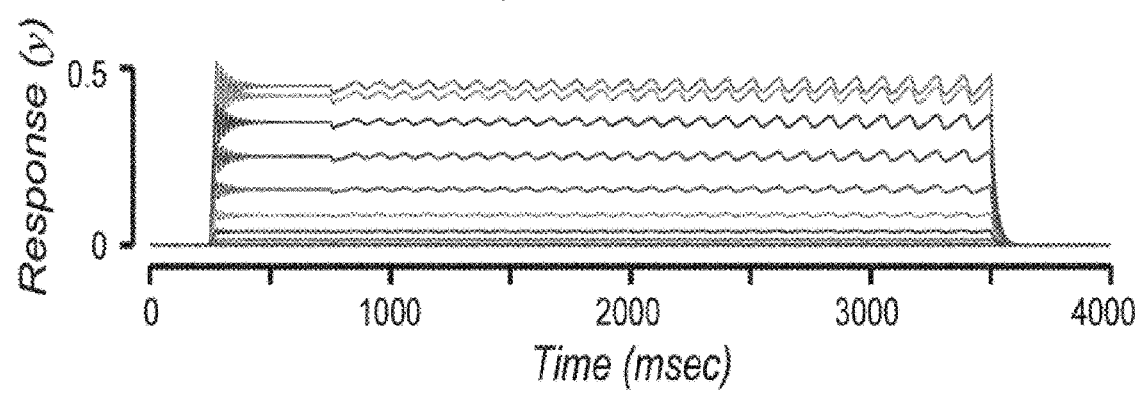

In some embodiments, recurrent neural networks in accordance with the present disclosure and implemented as shown in FIGS. 11A-11C, can be used to normalize the output responses. The recurrent modulator (a) can be used to provide normalization. The recurrent modulator a determines the amount of recurrent gain. In an example, the recurrent modulator a was implemented as a nonlinear function of the responses y (see below) instead of the linear function expressed by Eq. 11. For an input drive z that was constant for a period of time, the output responses achieved a stable state in which they were normalized:

$$|y_j|^2 = \frac{|z_j|^2}{\sigma^2 + \sum |z_j|^2}. \quad (62)$$

The responses were proportional to the input drive when the amplitude of the input drive was small (e.g., when the sum of the squared input drives was $\ll \sigma$). The responses saturated (e.g., leveled off) when the amplitude of the input drive was large ($\gg \sigma$). The value of $\sigma$ (the semi-saturation constant) determined the input drive amplitude that achieved half the maximum response. In spite of saturation, the relative responses were:

$$\frac{|y_j|^2}{\sum |y_j|^2} = \frac{|z_j|^2}{\sum |z_j|^2}. \quad (63)$$

As indicated by Eq. 63, the normalized responses represented a ratio between the input drive to an individual unit and the amplitude of the input drive summed across all of the units. Consequently, the output responses all saturated together (at the same input drive amplitude) even though some outputs were strong while others were weak.

Recurrent normalization can make the recurrent network robust with respect to imperfections in the recurrent weight matrix, as shown in FIGS. 11A-11C. Without normalization, responses may depend critically on fine tuning. For example, we implemented an embodiment like that illustrated in FIG. 3A-3F, but scaled the recurrent weight matrix so that the largest eigenvector was 1.02 instead of 1. The output responses were unstable, growing without bound, as shown in FIG. 11A. FIG. 11B shows the same output responses on an expanded (240×) ordinate. Including normalization automatically stabilized the output responses, as shown in FIG. 11C. The increases in activity evoked by the recurrent weight matrix (with the largest eigenvalue=1.02) were countered by normalization such that the total output was roughly constant over time ($\|y\|^2 \approx 1$). The ratios of the responses were maintained (Eq. 63), enabling an accurate readout, throughout the delay period. Analogous results were obtained with the other example embodiments described above.

Normalization was implemented in this embodiment as a dynamical system described by coupled differential equations:

$$\tau_y \frac{dy_j}{dt} = -y_j + \left(\frac{b^+}{1+b^+}\right)z_j + \left(\frac{1}{1+a^+}\right)\hat{y}_j \quad (64)$$

$$\tau_b \frac{db}{dt} = -b + w_{bx}^t x$$

$$\tau_a \frac{da}{dt} = -a + \sqrt{u} + \sqrt{u}\, a + w_{ax}^t x$$

$$\tau_u \frac{du}{dt} = -u + u\|y\|^2 + \left(\frac{\sigma b^+}{1+b^+}\right)^2.$$

where the norm of y is the sum of squares of the real and imaginary parts, summed across output responses:

$$\|y\|^2 = \sum_j |y_j|^2 = \sum_j [\text{Re}(y_j)^2 + \text{Im}(y_j)^2]. \quad (65)$$

To derive Eqs. 62-63 from Eqs. 64-65, we restrict the analysis to when $w_{ax}^t x=0$, and when a and b are both $\geq 0$ (noting that this will generally be the case in the stable state), and we write the stable state by setting the derivatives in Eq. 64 equal to zero:

$$\frac{d|y_j|}{dt} = 0 \text{ and } |y_j| = |\hat{y}_j| \quad (66)$$

$$|y_j|^2 = \left(\frac{1}{1+b}\right)|z_j|^2 + \left(\frac{1}{1+a}\right)|\hat{y}_j|^2$$

$$\left(\frac{a}{1+a}\right)^2 |y_j|^2 = \left(\frac{b}{1+b}\right)^2 |z_j|^2$$

$$|y_j|^2 = \left(\frac{1+a}{a}\right)^2 \left(\frac{b}{1+b}\right)^2 |z_j|^2$$

$$\frac{da}{dt} = 0 \quad (67)$$

$$a = \sqrt{u} + \sqrt{u}\, a$$

$$a = (1+a)\sqrt{u}$$

$$u = \left(\frac{a}{1+a}\right)^2$$

$$\frac{du}{dt} = 0 \quad (68)$$

$$u = u\|y\|^2 + \left(\frac{\sigma b}{1+b}\right)^2$$

$$u(1-\|y\|^2) = \left(\frac{\sigma b}{1+b}\right)^2.$$

Combining these equations yields the desired results (Eqs. 62-63).

Some embodiments compute weighted normalization. One such embodiment is expressed by replacing the last line of Eq. 64 with the following expression for u:

$$\tau_u \frac{du_j}{dt} = -u_j + \sum_k w_{jk} u_k |y_k|^2 + \left(\frac{\sigma b^+}{1+b^+}\right)^2. \quad (69)$$

The values of $w_{jk}$ are normalization weights and the responses y of this recurrent neural network can achieve a stable state, for a constant input drive z, that is given by the following weighted normalization equation:

$$y = \frac{z^2}{\sigma^2 + Wz^2}, \quad (70)$$

where the matrix W comprises the normalization weights $w_{jk}$, and the division notation in Eq. 70 means element-by-element division.

The dynamical system expressed by Eq. 64 is but one example embodiment of recurrent normalization. A person of skill in the art recognizes that there is, in fact, a family of dynamical systems, each of which comprises coupled neural integrators to implement normalization. The various embodiments in this family of dynamical systems achieve the same stable state (Eq. 62), but the various different models in this family correspond to different embodiments with different dynamics. Likewise, the dynamical system expressed by replacing the last line of Eq. 64 with Eq. 69 is but one example embodiment of recurrent weighted normalization, and there is a family of dynamical systems that achieve the same stable state (Eq. 70).

In some embodiments, ORGaNICs can be stacked in layers such that the inputs to one ORGaNIC are the outputs (or the readouts) from one or more other ORGaNICs. Particular stacked architectures encompass convolutional neural nets (e.g., deep nets) as a special case, specifically when the encoding/embedding weight matrices are convolutional and when the modulators are large ($a_j=b_j\gg 0$) such that the output responses from each layer are dominated by the input drive to that layer.

Some embodiments of ORGaNICs can be stacked, following Heeger's Theory of Cortical Function (Heeger, PNAS, 2017) to include feedback connections and the capability of a generative model, but with greater flexibility and computational power because of the general form for the recurrent weight matrix, and because there may be a separate pair of modulators for each output unit. Heeger's Theory of Cortical Function (TCF) has a single modulator for all of the units in each layer whereas ORGaNICs can have a separate pair of modulators, $a_j$ and $b_j$, for each unit. ORGaNICs also have a more general form for the recurrent weight matrix. But TCF includes a feedback drive across the layers of a stacked architecture, in addition to the input drive and recurrent drive. In some states (depending on the values of the modulators), the output responses are dominated by the feedforward drive and TCF is identical to a conventional feedforward model (e.g., deep net). In other states, TCF is a generative model that constructs a sensory representation from an abstract representation, analogous to a generalized adversarial network. In still other states, TCF combines prior expectation with sensory input, explores different possible perceptual interpretations of ambiguous sensory inputs, and predicts forward in time. ORGaNICs can be combined with TCF to offer the combined capabilities of both. Specifically, the optimization criterion in Eq. 1 can be combined with the optimization criterion of TCF (Heeger, 2017, Eq. 1. A combined dynamical systems equation can be derived by taking the derivative (using the chain rule) of the combined optimization criterion. The resulting dynamical system can be implemented with analog electrical circuits.

There is considerable flexibility in the formulation of ORGaNICs, with different variants corresponding to different embodiments. For example, we could replace $1/(1+a^+)$ in Eq. 3 with $2a'/(1+a')$, in which $0<a'<1$. In the original formulation, the activity of the modulator $a^+$ equals 0 during a delay period and non-zero during reset. But in this formulation, the modulator a' equals 1 during a delay period and zero during reset. We have implemented and tested many other variants as well; in fact, there is a large family of dynamical systems models, each of which uses coupled neural integrators, with similar functionality.

Different embodiments have various different options for the readouts. Some embodiments, such as the sustained activity embodiment depicted in FIG. 3, can use linear readouts based on the eigenvectors of the recurrent weight matrix. Some embodiments, such as the motor control and time warping embodiments depicted in FIGS. 9 and 10, can use different linear readouts. Some embodiments, such as the embodiment exhibiting oscillatory dynamics depicted in FIG. 5, can use a nonlinear modulus readout ($r^+=|W_{ry}y|$,). Some embodiments, such as the embodiment exhibiting complex dynamics depicted in FIG. 6, can use a sign-correcting nonlinear readout ($r^+$ in Eq. 23).

Various options can be used to compute the modulators. According to the embodiment expressed by Eq. 11, the recurrent modulators $a_j$ are a linear sum of the responses $W_{ay}y$. According to the embodiment expressed by Eq. 64, the recurrent modulators are a The recurrent modulators (and similarly, the input modulators $b_j$) can be computed as linear sums of the modulus of the responses, $W_{ay}|y|$, or linear sums of the various possible readouts: $W_{ay}r$, $W_{ay}|r|$, Re($W_{ay}r$), etc.

According to Eq. 3, there can be a separate pair modulators $a_j$ and $b_j$ for each neuron, but this need not be the case. Subgroups of units might share some modulators. For example, all of the units shared a single pair of modulators in various of the illustrative embodiments described above. Another option would be to have a number of basis modulators that are shared:

$$a_j = \sum_{k}^{K} w_{jk} a_k, \tag{71}$$

where $a_k$ are the responses of the basis modulators, $w_{jk}$ are weights, and the number of basis modulators K is less than the number of units N. And likewise for the input modulators $b_j$.

ORGaNICs can offer a number of advantages over conventional LSTMs. ORGaNICs, in comparison with LSTMs, can be well-suited for processing oscillating signals comprised of damped oscillators, in which the amplitudes, frequencies and phases of the oscillators change over time (e.g., speech, music, human movement). For many AI applications (e.g., speech processing, music processing, analyzing human movement), the dynamics of the input signals may be characterized with damped oscillators, in which the amplitudes, frequencies and phases of the oscillators may change over time. ORGaNICs are well-suited for these kinds of signals. Likewise, some embodiments use damped-oscillator basis functions as a means for predicting forward in time. Traditional LSTMs essentially approximate modulated, oscillatory signals with piecewise constant (or piecewise exponential) functions.

ORGaNICs can be simpler to design because their functionality can be analyzed mathematically.

ORGaNICs can be implemented with a simple analog electrical circuit, thereby offering favorable energy-efficiency. Given the analog electrical circuit implementation of ORGaNICs (e.g., as illustrated in FIG. 6A), it is possible to design and fabricate analog VLSI ORGaNICs chips. Analog circuitry may be more energy-efficient in comparison to representing and processing information digitally. Such an analog electrical-circuit may be configured to download various parameter settings (e.g., the weight matrices), computed separately offline.

ORGaNICs can rescale the recurrent weight matrix to ensure stability and to avoid exploding gradients during learning. Some embodiments rescale the recurrent weight matrix so that the eigenvalue with the largest real part is no larger than 1. This rescaling can be added as an extra step during learning after each gradient update. Doing so helps to avoid vanishing gradients by using halfwave rectification instead of a sigmoidal output nonlinearity.

ORGaNICs can incorporate normalization to make the computation robust with respect to imperfections in the recurrent weight matrix (e.g., as illustrated in FIG. 11C). Normalization can maintain the ratios of the responses (Eq. 63), unlike sigmoids or other static output nonlinearities (also called transfer functions) that are typically used in ML systems.

ORGaNICs, unlike LSTMs, can have multiple recurrent weight matrices, each multiplied by different recurrent modulators. The modulators in ORGaNICs, analogous to the input and reset gates in LSTMs, perform multiple functions. Some embodiments of ORGaNICs, unlike LSTMs, can have multiple recurrent weight matrices, each multiplied by different recurrent modulators, to perform combinations of these functions (e.g., Eq. 61 and as demonstrated by the embodiment shown in FIGS. 10A-10E). This is unlike an LSTM that has only a single recurrent weight matrix and a single reset gate.

ORGaNICs can execute time warping (e.g., as demonstrated by the embodiment shown in FIGS. 10A-10E). Invariance with respect to compression or dilation of temporal signals (e.g., fast vs. slow speech) is a challenge for many AI applications. ML systems typically attempt to circumvent this problem by learning models with every possible tempo. ORGaNICs can be applied to solve this problem much more efficiently, eliminating redundancy and increasing generalization, with less training.

Figure 12:
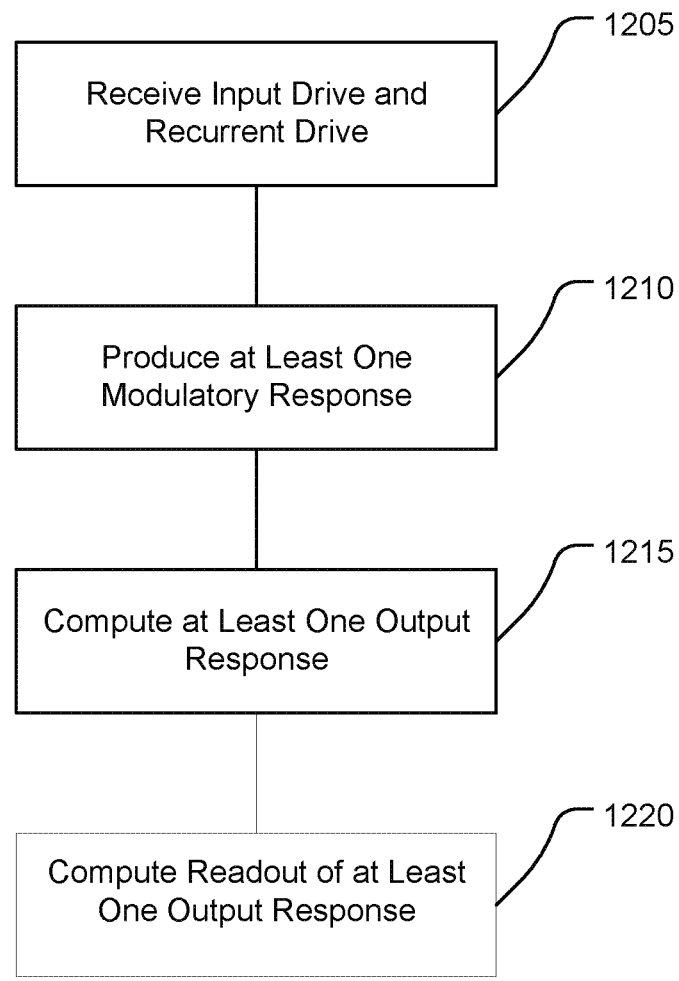
FIG. 12 illustrates a method for computation using a recurrent neural network according to an exemplary implementation.

Referring now to FIG. 12, a method 1200 for computation using a neural network is shown according to an embodiment of the present disclosure. The method 1200 can be implemented with various hardware- and/or software-based systems, including using a computer program, an analog-electrical circuit, and/or an analog VLSI.

At 1205, an input drive and a recurrent drive are received by one or more computational units. The input drive can be a function of one or more inputs, which may vary in time. The recurrent drive can be a function of one or more output responses computed as described below.

At 1210, at least one modulatory response is produced. The at least one modulatory response can be produced by one or more modulators. Each modulatory response can be based on a function of the one or more inputs, one or more output responses (computed as described below), and/or an offset (e.g., a constant). In some embodiments, each modulatory response is computed using a weight matrix and at least one of (1) at least one of the one or more inputs or (2) at least one output response. For example, as shown in Eqs. 11-12, the modulators a, b, can be defined based on input(s) x and/or outputs y (it will be appreciated that, e.g. with respect to the modulator a, the values of the weight matrices $W_{ax}$, $W_{ay}$ can each be set to non-zero values so that the modulator a depends on the input(s) x and/or outputs y, respectively, or set to values of zero so that the modulator a does not depend on the respective input(s) x and/or outputs y. In some embodiments, a first modulator generates a first modulatory response to apply a gain to the recurrent drive, and a second modulator generates a second modulatory response representative of a time constant of the output response. It will be appreciated that the weights and/or offsets can be vectors or matrices which are multiplied with the appropriate variables (e.g., input(s) x and/or outputs y) to execute the computations of the method 800.

At 1215, at least one output response is computed. The output response is computed as a sum of (1) the input drive multiplied by a function of at least one of the at least one modulatory response, each input drive comprising a function of at least one input, and (2) the recurrent drive multiplied by a function of at least one of the at least modulatory response. The sum can be modified using an output nonlinearity, including but not limited to sigmoid or rectification.

At 1220, a readout is computed as a function of the at least one output response. The readout can be a weighted sum of the at least one output response. The weighted sum can include an offset, and each weight corresponding to each weighted sum and each offset can be one of a real number and a complex number. In some embodiments, at least one input to one or more of the computational units includes at least one readout from others of the computational units. The readout can be computed based on applying an output nonlinearity to the weighted sum. In some embodiments, the readout is the at least one output response (e.g., is computed using an identity matrix).

In some embodiments, the method 1200 includes computing a sum of the input drive and the recurrent drive. The input drive can depend on a weighted sum of the at least one input multiplied by a function of at least one of the at least one modulatory response. The recurrent drive can depend on a weighted sum of the at least one output response multiplied by a function of at least one of the at least one modulatory response. Each weighted sum can an offset. Each weight corresponding to each weighted sum and each offset can be one of a real number and a complex number. In some embodiments, the weights and offsets are determined by executing a machine learning algorithm including at least one of backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization.

In some embodiments, the method 1200 includes applying an output nonlinearity to the at least one output response. The output nonlinearity can be one of rectification, halfwave rectification, a sigmoid, hyperbolic tangent, or normalization. The readout can be a weighted sum of the values resulting from subjecting the at least one output response to the output nonlinearity, wherein the weighted sum is based on a weight and includes an offset, and wherein each weight and offset is one of a real number and a complex number.

The method 1200 can include computing, by each modulator, a weighted sum of at least one of: (1) a weighted sum of the at least one input, wherein the at least one input includes a plurality of inputs; or (2) a weighted sum of the at least one output response, wherein the at least one output response includes a plurality of output responses, wherein each weighted sum includes an offset, and wherein each weight corresponding to each weighted sum and each offset is one of a real number and a complex number. An output nonlinearity can be applied to each modulator sum, and machine learning algorithm(s) can be used to determine the weights and offsets.

There can be many variants of the embodiments described above. Some embodiments comprise a hierarchical cascade of a plurality of layers in which the output responses from one recurrent neural network (e.g., ORGaNIC) serve as the inputs to another ORGaNIC. In some embodiments, the modulators in one layer depend on a function of the outputs of another (e.g., higher) layer in the hierarchy. Some embodiments comprise weights in which one or more of the weight matrices are convolutional such the weights in each row of the weight matrix are shifted copies of one another. A person of skill in the art recognizes that there are a variety of options for handling the weights at the ends of each row of a convolutional weight matrix (e.g., wrapping, reflecting). In some embodiments, output responses and/or modulators are computed as weighted sums, each followed by an output nonlinearity (e.g., rectification, sigmoid). A person of skill in the art recognizes that any of a number of output nonlinearities can be substituted. In other embodiments, the modulators are computed as nonlinear functions of the inputs and outputs (e.g., for implementing automatic gain control).

Various embodiments are described in the general context of method steps, which can be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present disclosure could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential. In some cases, the actions recited in the claims can be performed in a different order and still achieve desirable results. In certain implementations, multitasking and parallel processing may be advantageous.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. Therefore, the above embodiments should not be taken as limiting the scope of the present disclosure.

What is claimed is:

1. A method for computation with recurrent neural networks, comprising:
   receiving, by one or more computational engines, an input drive and a recurrent drive;
   producing, by each of one or more modulators, at least one modulatory response;
   computing, by the one or more computational engines, at least one output response using one or more computational units, each output response comprising a sum of:
   (1) the input drive multiplied by a function of at least one of the at least one modulatory response, each input drive comprising a function of at least one input, wherein the at least one input is at least one of compressed or dilated as a function of time, and
   (2) the recurrent drive multiplied by a function of at least one of the at least one modulatory response, each recurrent drive comprising a function of the at least one output response, each modulatory response comprising a function of at least one of (i) the at least one input, (ii) the at least one output response, or (iii) at least one first offset;
   varying, by the one or more computational engines, the one or more modulators to adjust for the at least one of compression or dilation of the at least one input; and
   computing a readout of the at least one output response, the readout comprising a function of the at least one output response.

2. The method of claim 1, the method further comprising:
   computing, by each computational engine, a sum of the input drive and the recurrent drive, wherein:
   the at least one input includes a plurality of inputs;
   the at least one output response includes a plurality of output responses;
   the input drive depends on a first weighted sum of the plurality of inputs multiplied by a function of at least one of the at least one modulatory response, the first weighted sum including at least one second offset;
   the recurrent drive depends on a second weighted sum of the plurality of output responses multiplied by a function of at least one of the at least one modulatory response, the second weighted sum including at least one third offset; and
   each weight corresponding to each weighted sum, the at least one first offset, the at least one second offset, and the at least one third offset are each one of a real number and a complex number.

3. The method of claim 2, further comprising:
   executing a machine learning algorithm to determine the weights and offsets in each weighted sum, wherein the machine learning algorithm comprises at least one of a neural network, support vector machine, regression, Bayesian network, random forest, backpropagation, gradient descent, stochastic gradient descent, reinforcement learning, adaptive dynamic programming, singular value decomposition, principal components analysis, clustering, k-means clustering, spectral clustering, multidimensional scaling, or matrix factorization algorithm.

4. The method of claim 1, further comprising:
   computing, by each modulator, a third weighted sum of:
   (1) a fourth weighted sum of the at least one input, wherein the at least one input includes a plurality of inputs, wherein the fourth weighted sum includes at least one fourth offset; and (2) a fifth weighted sum of the at least one output response, wherein the at least one output response includes a plurality of output responses, wherein the fifth weighted sum includes at least one fifth offset, and wherein each weight corresponding to each of the fourth and fifth weighted sums, the at least one fourth offset, and the at least one fifth offset are each one of a real number and a complex number.

5. The method of claim 1, wherein the readout is a weighted sum of the at least one output response, the at least one output response comprising a plurality of output responses, wherein the weighted sum includes at least one second offset, and wherein each weight corresponding to the weighted sum and the at least one second offset are each one of a real number and a complex number.

6. The method of claim 1, wherein the at least one input to a first one or more of the computational engines comprises at least one readout from at least one other computational engine of the one or more computational engines.

7. The method of claim 1, further comprising using the at least one output response to control operation of a robotic device using open loop control based on a linear transform of the readout or closed loop control.

8. The method of claim 1, further comprising normalizing the at least one output response.

9. The method of claim 1, wherein the one or more computational engines are a first one or more computational engines, the method further comprising providing the at least one readout to a second one or more computational engines.

10. The method of claim 1, further comprising performing recursive quadrature filtering.

11. The method of claim 1, further comprising using a plurality of recurrent weight matrices, each recurrent weight matrix multiplied by at least one of the one or more modulators.

12. The method of claim 1, further comprising computing at least one of the one or more modulators as a nonlinear function of the at least one input and the at least one output.

13. A system for computation with recurrent neural networks, comprising:
   one or more processors; and
   a memory storing computer-readable instructions which when executed by the one or more processors, cause the one or more processors to:
   compute at least one modulatory response using one or more modulators;
   compute at least one output response using one or more computational engines, each computational engine configured to receive an input drive and a recurrent drive, each output response comprising a sum of:
   (1) the input drive multiplied by a function of at least one of the at least one modulatory response, each input drive comprising a function of at least one input, and
   (2) the recurrent drive multiplied by a function of at least one of the at least one modulatory response, each recurrent drive comprising a function of the at least one output response, each modulatory response comprising a function of at least one of (i) the at least one input, (ii) the at least one output response, or (iii) at least one first offset; and
   compute a readout of the at least one output response, the readout comprising a function of the at least one output response; and
   normalize the at least one output response.

14. The system of claim 13, wherein the memory further comprises instructions to cause the one or more processors to:

apply an output nonlinearity to the at least one output response.

15. The system of claim 13, wherein the at least one input to a first one or more of the computational engines comprises at least one readout from at least one other computational engine of the one or more computational engines.

16. A device for computation with recurrent neural networks, comprising:

an analog electrical-circuit for implementing a recurrent neural network;

wherein the analog electrical-circuit is configured to compute at least one output response from one or more computational units;

wherein the analog electrical-circuit is further configured to compute at least one modulatory response from one or more modulators;

wherein the analog electrical-circuit is further configured to compute a readout of the at least one output response;

wherein each output response is the sum of an input drive multiplied by a function of at least one of the at least one modulator response plus a recurrent drive multiplied by a function of at least one of the at least one modulator response;

wherein each input drive is a function of one or more inputs;

wherein each recurrent drive is a function of one or more of the at least one output response;

wherein each modulatory response is a function of at least one of (i) the one or more inputs, (ii) the at least one output response, or (iii) at least one first offset; and wherein the readout is a function of the at least one output response.

17. The device of claim 16, wherein the analog-electrical circuit is further configured to:

compute, by each computational unit, a sum of the input drive and the recurrent drive, wherein:

the at least one input includes a plurality of inputs;

the at least one output response includes a plurality of output responses;

the input drive depends on a first weighted sum of the plurality of inputs multiplied by a function of at least one of the at least one modulatory response, the first weighted sum including at least one second offset;

the recurrent drive depends on a second weighted sum of the plurality of output responses multiplied by a function of at least one of the at least one modulatory response, the second weighted sum including at least one third offset; and each weight corresponding to each weighted sum, the at least one first offset, the at least one second offset, and the at least one third offset are each one of a real number and a complex number.

18. The device of claim 16, wherein the analog-electrical circuit is further configured to apply an output nonlinearity to the at least one output response.

19. The device of claim 16, wherein the analog electrical-circuit is implemented using analog VLSI.

* * * * *